(12) United States Patent
Phipps et al.

(10) Patent No.: US 10,495,869 B2
(45) Date of Patent: Dec. 3, 2019

(54) SEALING AND LATERAL PRESSURE COMPENSATION STRUCTURES USABLE WITH FLUIDIC OR GASEOUS MATERIAL CONTAINERS

(71) Applicant: ABL IP HOLDING LLC, Conyers, GA (US)

(72) Inventors: James Michael Phipps, Fairfax, VA (US); John M. Reilly, Leesburg, VA (US); Alexander Jacob Schultz, Sterling, VA (US); Steve Lyons, Herndon, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 35 days.

(21) Appl. No.: 15/661,742

(22) Filed: Jul. 27, 2017

(65) Prior Publication Data
US 2019/0033573 A1    Jan. 31, 2019

(51) Int. Cl.
*G02B 26/08* (2006.01)
*G02B 26/00* (2006.01)
*G02F 1/29* (2006.01)
*G02B 7/00* (2006.01)
*F16J 15/06* (2006.01)
*G02B 19/00* (2006.01)

(52) U.S. Cl.
CPC .......... *G02B 26/005* (2013.01); *G02B 7/008* (2013.01); *F16J 15/068* (2013.01); *G02B 19/0028* (2013.01); *G02B 19/0061* (2013.01)

(58) Field of Classification Search
CPC .. G02B 26/005; G02B 17/006; G02B 26/001; G02B 3/14; G02B 19/0061; G02B 2207/115; G02B 26/004; G02B 3/12

USPC ................ 359/237, 242, 290–292, 295, 298
See application file for complete search history.

(56) References Cited

U.S. PATENT DOCUMENTS

| 9,635,759 | B2 | 4/2017 | Venk et al. | |
| 2011/0203354 | A1* | 8/2011 | Yang | B01L 3/502761 |
| | | | | 73/61.72 |
| 2013/0342889 | A1* | 12/2013 | Kim | G02B 26/005 |
| | | | | 359/290 |
| 2017/0018214 | A1 | 1/2017 | Black et al. | |

(Continued)

OTHER PUBLICATIONS

U.S. Appl. No. 15/479,857 entitled "Electrowetting Assembly Technique and Cell Structure ," filed Apr. 5, 2017.

(Continued)

*Primary Examiner* — Brandi N Thomas
(74) *Attorney, Agent, or Firm* — RatnerPrestia

(57) ABSTRACT

The examples herein relate to assembly techniques and structures for sealing and lateral pressure compensation techniques that can be utilized in, for example, an electrowetting cell. The electrowetting cell can include a substrate that supports a well filled with a liquid. The electrowetting cell can include a control channel electrode to control the liquid via an electric field and a circuit connection to drive the control channel electrode. A seal is coupled to a spacer to seal the well between the substrate and the transparent cover. An expansion space, exterior to the well, is formed with the coupling of the seal and the spacer. As the liquid or the gas thermally expands or contracts, the seal compensates laterally by deforming sideways in an empty space of the expansion space.

11 Claims, 20 Drawing Sheets

(56) References Cited

U.S. PATENT DOCUMENTS

2017/0045203 A1    2/2017  Mao et al.
2017/0146956 A1*   5/2017  Vouillamoz ............ G04C 17/00

OTHER PUBLICATIONS

U.S. Appl. No. 15/228,414 entitled "Configurable Optical Transducers Using an Optical Modulator and One or More Lenses," filed Aug. 4, 2016.
U.S. Appl. No. 15/389,829 entitled "Electrowetting Cellular Array and Luminaire Incorporating the Array," filed Dec. 23, 2016.

* cited by examiner

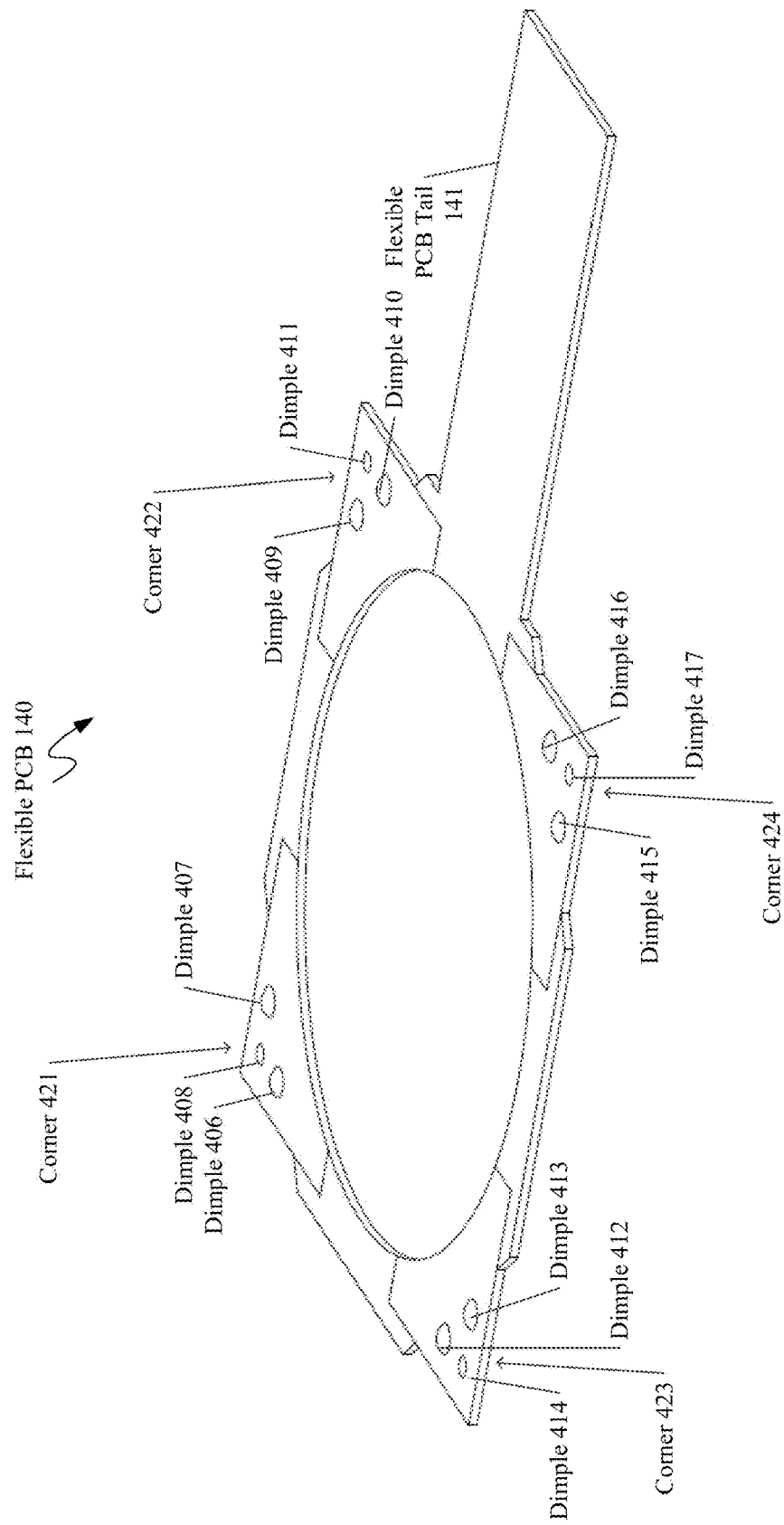

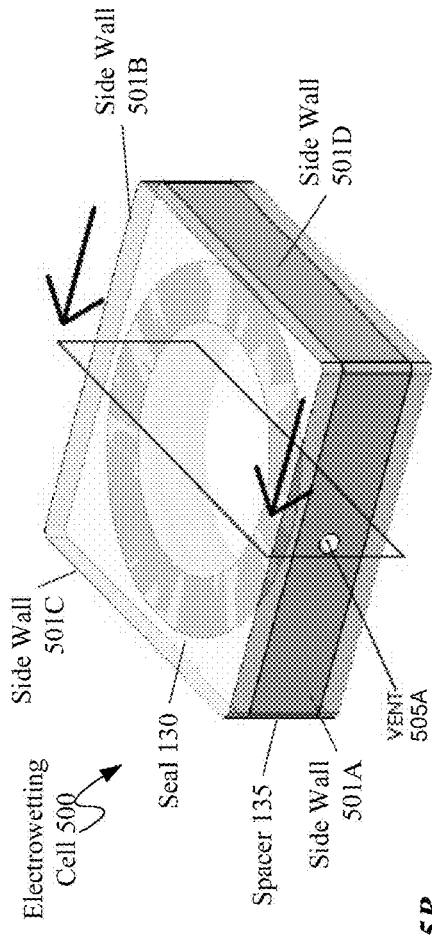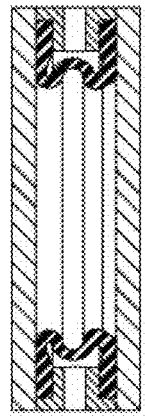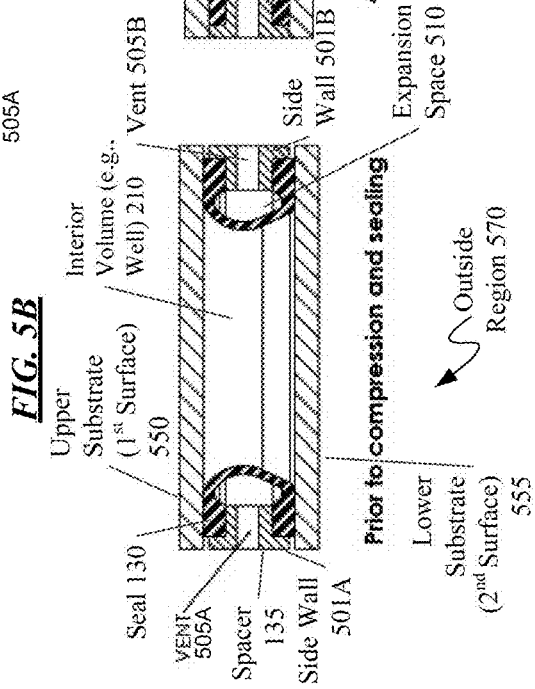

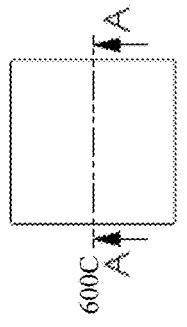
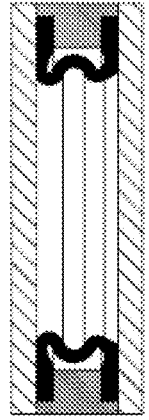
FIG. 6C
Electrowetting Cell 600C
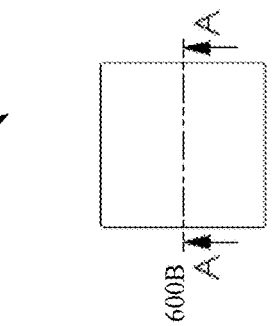
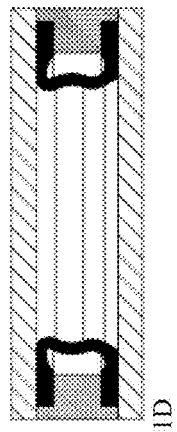
FIG. 6B
Electrowetting Cell 600B
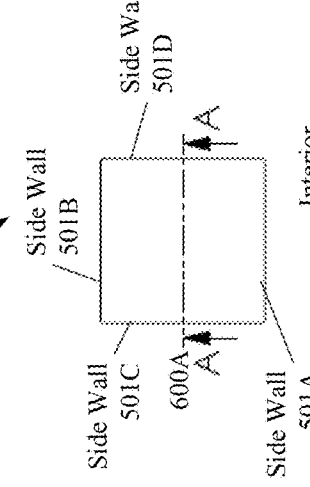
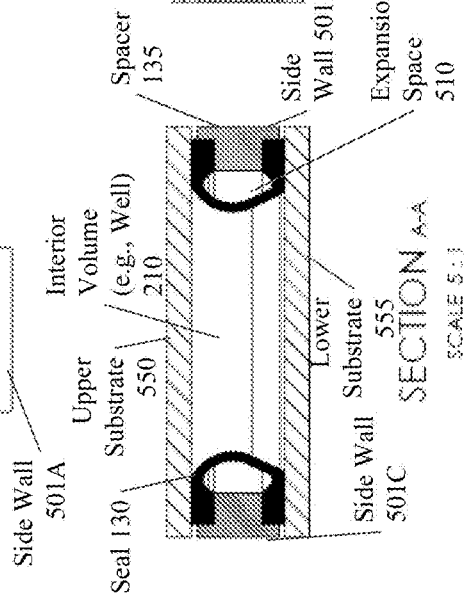
FIG. 6A
Electrowetting Cell 600A

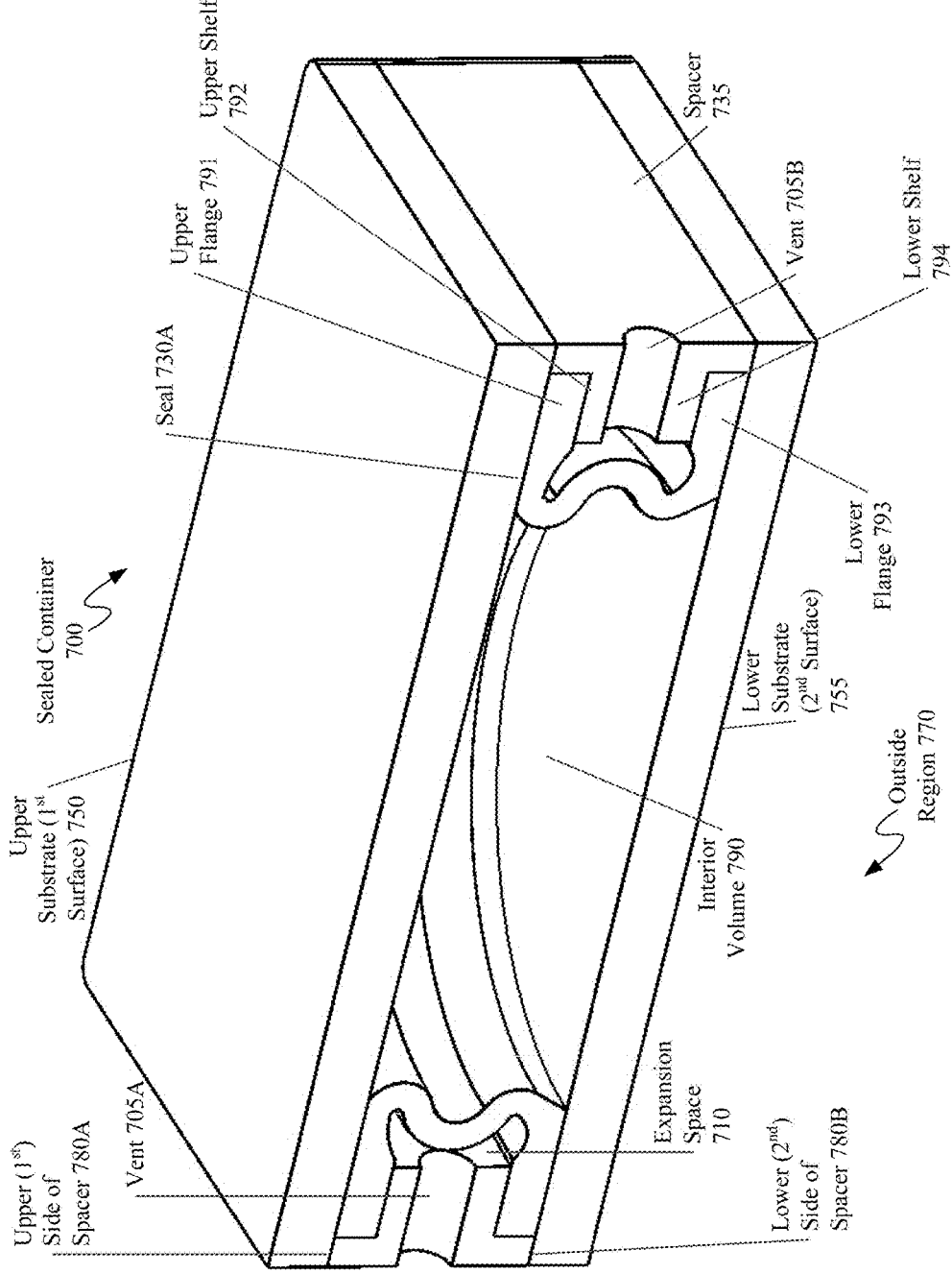

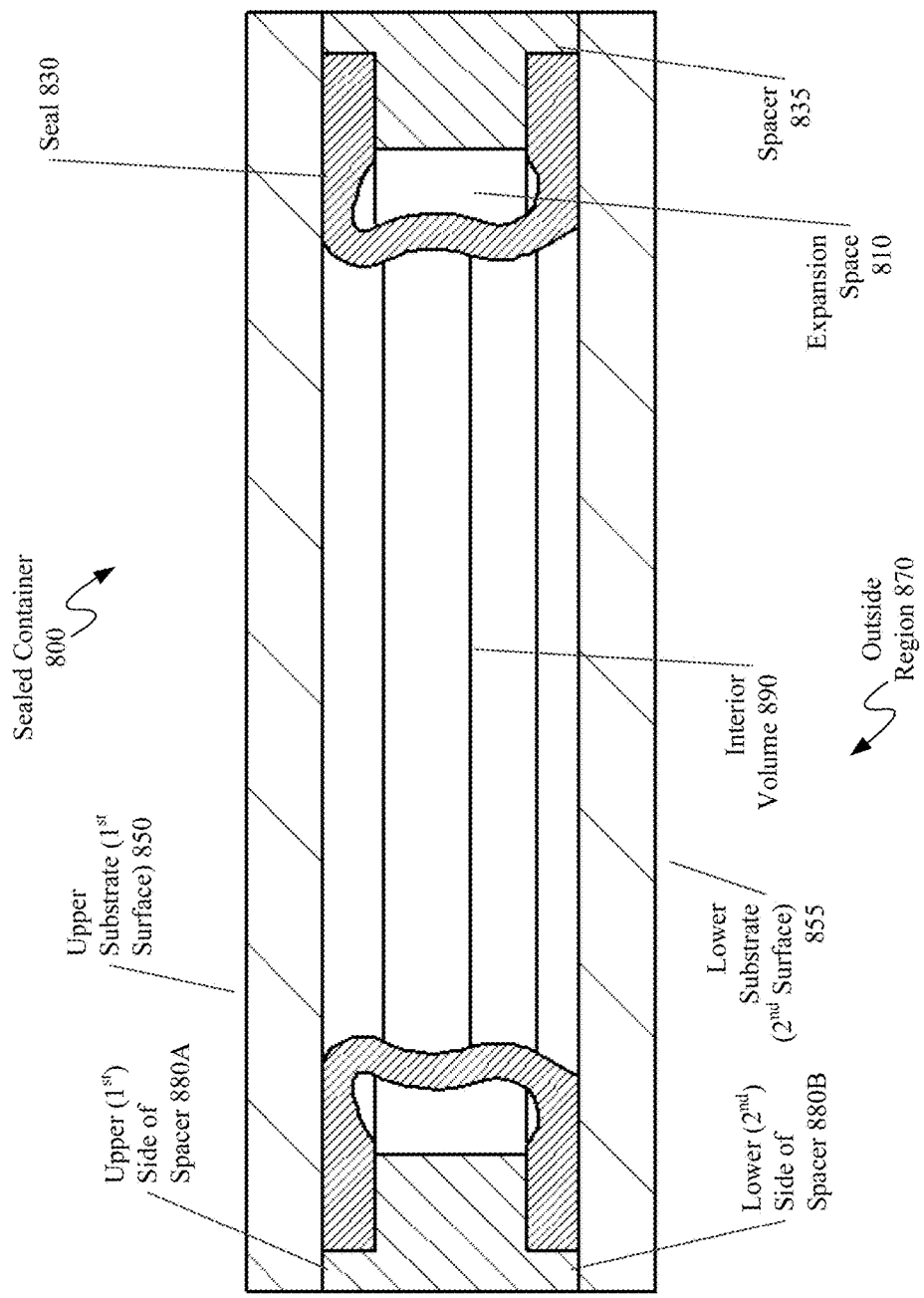

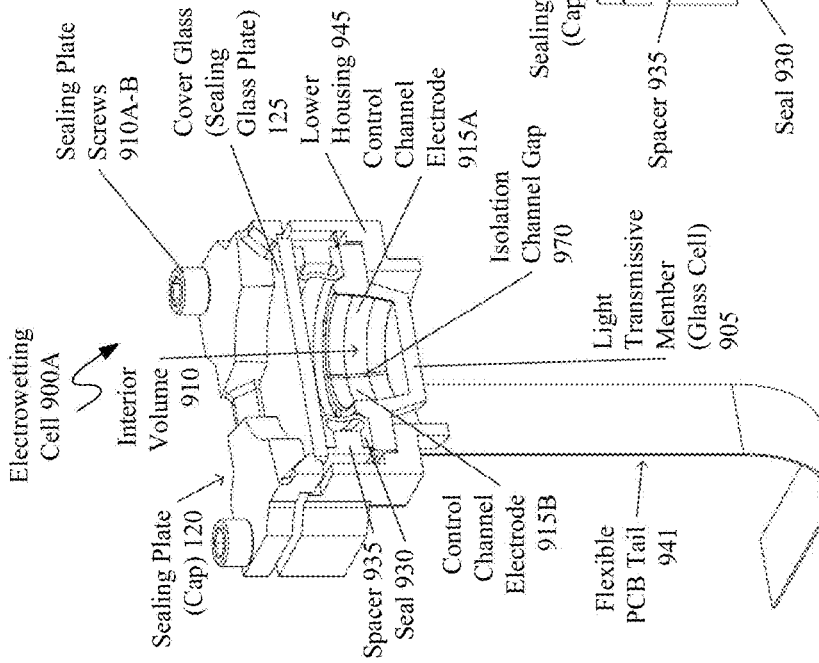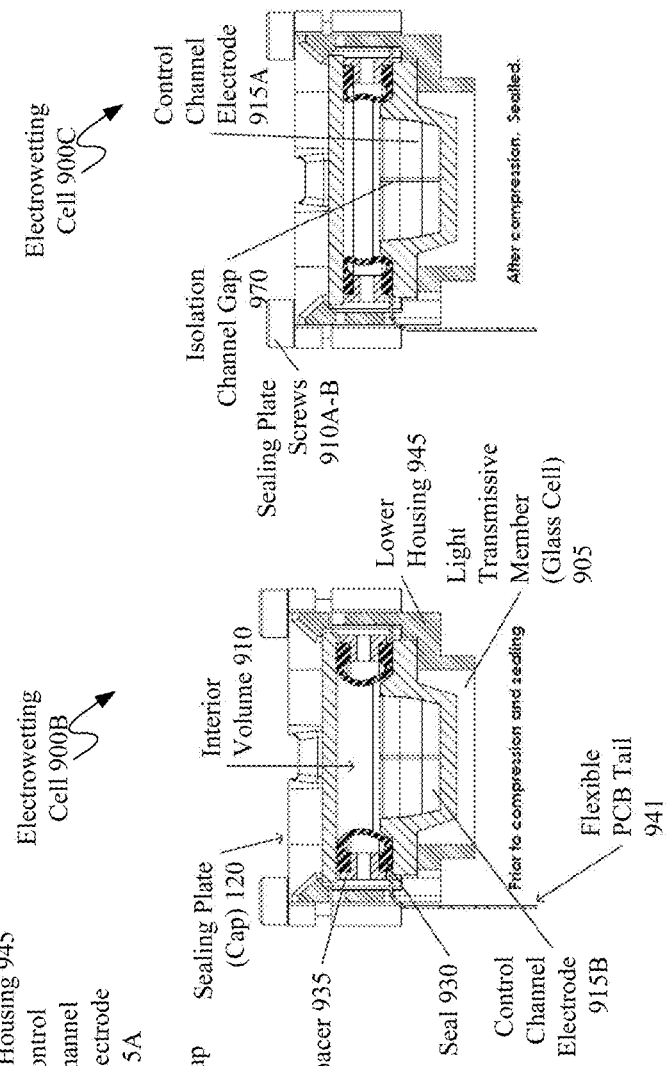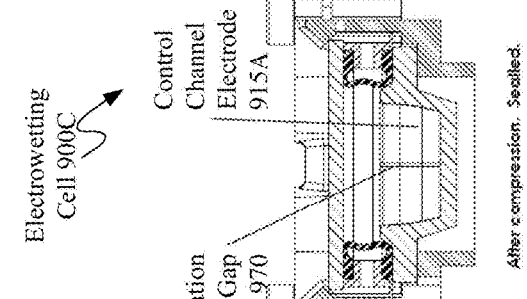

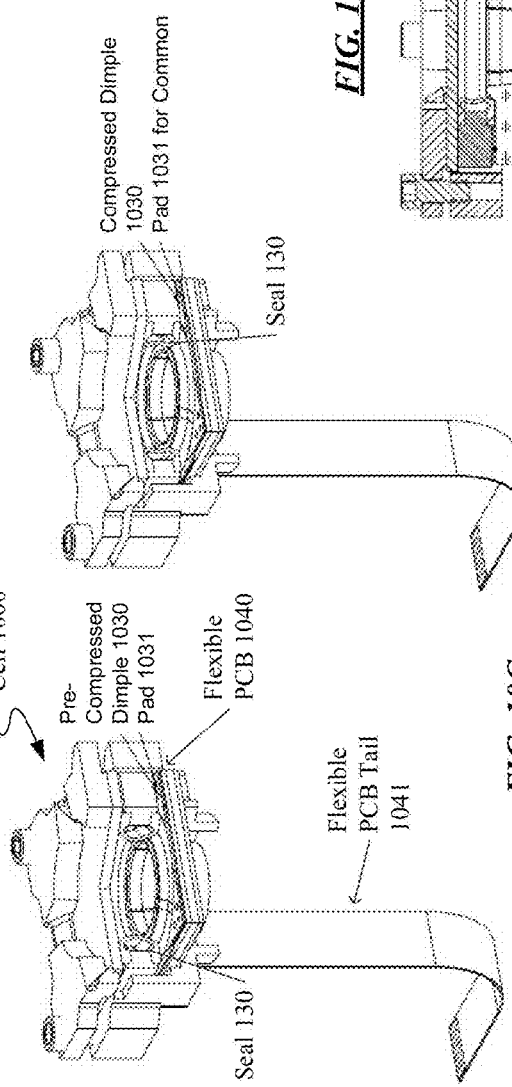
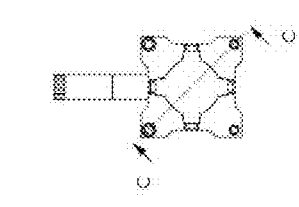
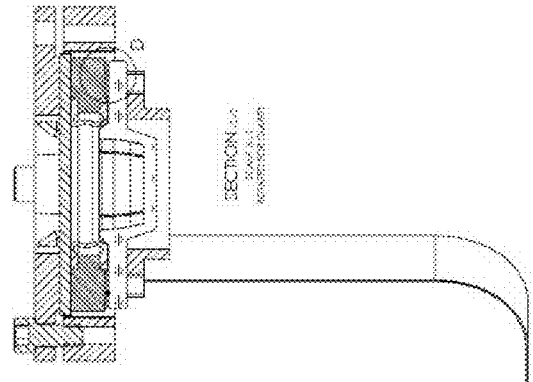
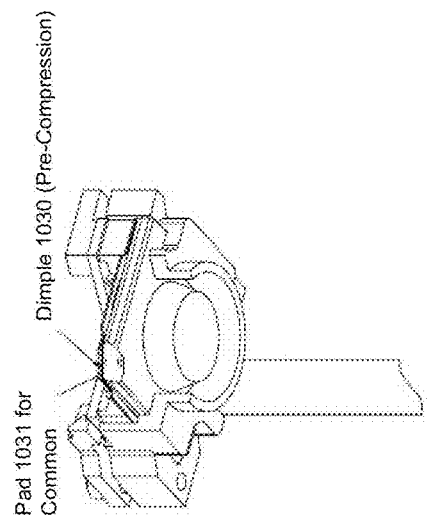
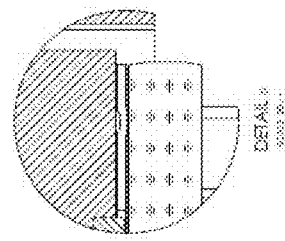

SEALING AND LATERAL PRESSURE COMPENSATION STRUCTURES USABLE WITH FLUIDIC OR GASEOUS MATERIAL CONTAINERS

TECHNICAL FIELD

The present subject matter relates to techniques for sealing and pressure compensation structures of fluidic or gaseous material containers and/or sealing and assembling an electrowetting cell, e.g. fluid lens or prism, for beam shaping or steering applications or internet of things (IoT) devices.

BACKGROUND

For many years, there have been sealing chambers for gas and liquid containers for a wide range of applications. However, there is room for improvement in sealing chambers.

Consider for example an electrowetting cell. One example of prior art has utilized a thin stainless steel diaphragm (with an optical window adhered to it in a central axial location) folded over an electrowetting cell and a rubber membrane. This has allowed the primary seal (the rubber membrane) to remain stationary while the stainless steel diaphragm moves up and down to compensate for fluidic thermal expansion. Another prior art example includes an O-ring on top of the electrowetting cell whose compression changes to compensate for fluidic thermal expansion. Another prior art example includes two O-rings with one positioned between the electrowetting cell and a top sealing plate (may be glass or other material) and the other positioned between the outer surface of the top sealing plate and a fixed outer housing. This arrangement allows the two O-rings to compensate for fluidic thermal expansion by changing their relative amounts of compression as the pressure of the fluid pushes against the top sealing plate varying amounts. For all three of these prior art examples one of the optical surfaces is floating up and down, the upwards and downwards movement may adversely affect the optical capability of the electrowetting cell or impact the placement of other optical components used in conjunction with the cell. Moreover, prior electrowetting cells have utilized a much smaller amount of fluid located in a well and are driven within a relatively small temperature range that results in a relatively small amount of thermal expansion when compared to modern day large format electrowetting cells.

Electrowetting is a microfluidic phenomenon that modifies the shape of a liquid in relation to a surface by applying an electrical field, e.g. by applying a voltage across two electrodes. For example, if the surface is hydrophobic, the electrical field causes a change in the shape of the liquid that appears to change the wetting properties of the hydrophobic surface. If the fluid(s) in an electrowetting cell and some of the wall(s) around the fluid(s) are sufficiently transparent, the electrowetting cell may be used as an electrically controllable optic. Such optics have recently been the subject of a widening scope of light processing applications, such as variable lenses, variable prisms, optical switches, displays, etc.

Electrowetting lenses, for example, are conventionally used in the camera industry. An electrowetting cell structure for a lens for a camera application or the like, e.g., to selectively focus light input to an image sensor or to selectively control beam distribution of a flash, typically supports only beam shaping.

There have been proposals to develop variable optical prisms using electrowetting cell arrangements. An electrowetting lens may have various different shaped structures, e.g., round, square or rectangular. An electrowetting prism normally is square or rectangular. The overall working principle for either beam shaping or steering is the same—the voltage applied across the dielectric layer attracts the conducting liquid so as to change the wetting area of the cell and thus the shape of the liquid(s) in the cell.

SUMMARY

In an example, an electrowetting cell includes a substrate that supports a well filled with a liquid, a control channel electrode to control the liquid via an electric field, a circuit connection to supply a drive signal to the control channel electrode, and a transparent cover. The electrowetting cell further includes a spacer between the substrate and the transparent cover. The electrowetting cell also includes a seal coupled to the spacer to seal the well between the substrate and the transparent cover. An expansion space, exterior to the well, is formed with the coupling of the seal and the spacer.

In a second example, a sealing chamber assembly includes an interior volume having fluid or gas inside and a spacer surrounding at least a portion of the interior volume. The sealing chamber further includes a sealing gasket coupled to the spacer to seal the fluid or gas inside the interior volume and compensate for volumetric thermal expansion of the fluid or gas in the interior volume over a temperature range.

In a third example, a sealed container includes an upper substrate coupled to a spacer, a lower substrate coupled to the spacer, and an interior volume containing a fluid or a gas formed between the upper substrate, the lower substrate, and the spacer. The upper and lower substrates are compressed to sandwich the spacer and the interior volume there between to form the sealed container. The sealed container further includes a lateral pressure compensation structure built into the spacer that allows the fluid or gas in the interior volume to expand.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations, by way of example only, not by way of limitations. In the figures, like reference numerals refer to the same or similar elements.

FIG. 4 depicts components of an example of a flexible printed circuit board (PCB) for the example cell of FIG. 1.

FIG. 5A is a perspective view of an assembled generic electrowetting cell.

FIGS. 5B-D are cross-sections of the assembled electrowetting cell prior to compression and sealing, after compression and sealing, and during operation when temperatures are elevated leading to expansion of the sealed fluids.

FIGS. 6A-C are views of cross-sections of an assembled electrowetting cell of FIG. 5A.

FIG. 7A depicts a perspective view of a seal mounted on a spacer and compressed during operation.

FIGS. 8A-C depict cross-sectional views of a sealed container that includes a seal mounted on a spacer, where the seal is sandwiched between first and second surfaces during thermal expansion and contraction to provide a lateral pressure compensation structure.

FIGS. 9A-C depict perspective views of the cross-section of an assembly of an electrowetting cell that includes sealing plate screws, a sealing plate (cap), a sealing glass plate (cover glass), a seal, a spacer, a light transmissive member, and a lower housing.

FIGS. 10A-E depict perspective views of an assembly of an electrowetting cell that includes a dimpled flexible PCB design.

FIG. 10F is a zoomed in view of the encircled area in FIG. 10E and shows details of a dimple and a pad, and their contact to achieve electrical connection.

DETAILED DESCRIPTION

Figure 1A:
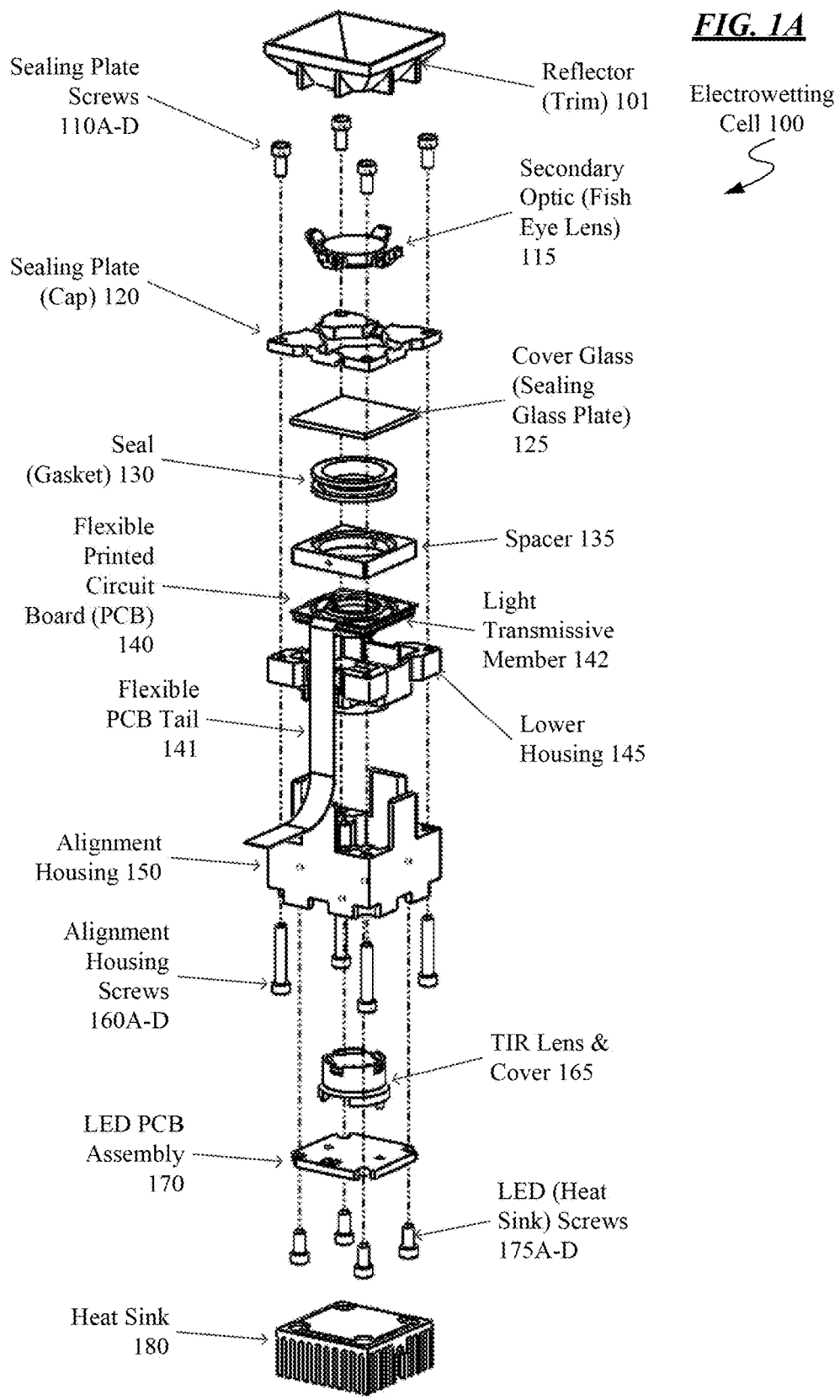
FIGS. 1A-B are exploded views of an electrowetting cell depicting components of the cell.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The examples in the drawing and described below relate to a sealing chamber assembly and to a variety of devices that may utilize such an assembly. The assembly includes an interior volume having fluid or gas inside. A spacer surrounds the interior volume. A sealing gasket is coupled to the spacer to seal the fluid or gas inside the interior volume.

The seal and/or the spacer are configured to enable compensation for volumetric thermal expansion of the fluid or gas in the interior volume as may be caused by variations in temperature of the fluid or gas inside, for example, during operation of a device that incorporates the chamber assembly.

The seal, spacer and assembly using those components to contain a liquid or gas may be utilized in a variety of devices for many different applications. It may be helpful to consider a specific application, and for that purpose, a number of the examples relate to incorporation of the sealing chamber assembly to contain fluid of an electrowetting cell (e.g. as may be used in a lighting device, a light sensor, camera, flash, etc.).

Electrowetting is a fluidic phenomenon that enables changing of the configuration of a contained fluid system in response to an applied voltage. In general, application of an electric field seemingly modifies the wetting properties of a surface (e.g. the ability of fluid to maintain physical contact with a hydrophobic surface) in the fluid system. Assuming a two fluid system, where one fluid is relatively conductive, and the other is relatively non-conductive; when a fluid is in contact with a surface and that surface becomes charged, the electric field tends to pull the mass of the electrically conductive fluid towards the surface. As the conductive fluid changes shape due to this force, the non-conductive fluid also changes shape. On a micro scale, the contact angle is unaffected. On a macro scale it seems that the wetting properties have changed. This phenomenon enables controlled changes to the overall distribution and shape of the fluids with respect to the surface, in response to changes of the voltage(s) applied to change the electric field.

Examples of electrowetting optics described in detail herein and shown in several of the drawings use two immiscible fluids having different electrical properties. In at least some examples, the two fluids have different indices of refraction. One fluid may be conductive. The other fluid, typically the fluid adjacent to a hydrophobic surface, may be non-conductive. The conductive fluid may be a transparent fluid, but the other fluid may be substantially transparent or transmissive. Where both fluids are transparent or transmissive, the non-conductive fluid may exhibit a higher index of refraction than the conductive fluid. However, this is not necessary. In some examples, the non-conductive fluid may exhibit a lower index of refraction than the conductive fluid.

Examples of electrowetting cells are disclosed in U.S. patent application Ser. No. 15/479,857, filed Apr. 5, 2017, entitled "Electrowetting Assembly Technique and Cell Structure," the entire contents of which is incorporated herein by reference.

In a transmissive electrowetting optic example using two fluids, changing the applied electric field changes the shape of the fluid interface surface between the two fluids and thus the refraction of the light passing through the interface surface, for example, so that the electrowetting optic operates as a variable shape lens and/or a variable shape prism. Depending on the application for the electrowetting optic, the light may enter the fluid system to pass first through either one or the other of the two fluids.

As commercial applications for electrowetting cells expand, such cells are used in increasing numbers. Production and varied applications of large numbers of electrowetting cells call for improved assembly techniques, e.g. more efficient and/or providing a more effective yield rate. An effective cell structure should include a suitable electrode layout, fluid sealing and mechanical structure yet enable an efficient assembly methodology.

Prior cell structures and associated assembly technologies often did not support beam steering and shaping functions in one type of cell structure. Different cell structures were typically used for beam steering and beam shaping, limiting the applications of each type of cell structure. The example electrowetting cell structure described below, which may support both beam steering and shaping functions in the one cell design. The ability to support both types of optical processing in one type of electrowetting cell structure, for example, facilitates use of the one type cell in a wider variety of variable optic applications, e.g. as a variable lens, as a variable prism or as a combination lens and prism with variable optical capabilities.

Various examples disclosed herein related to improvement in techniques for assembly of a sealed container, e.g. in an electrowetting cell and/or the structure of an electrowetting cell, with regard to sealing an interior volume of the sealed container where a liquid or gas resides and compensating for the thermal expansion of the liquid or gas. Accordingly, improvements in the compensation capability of seals for sealed containers, with a large amount of fluid or gas contained in an interior volume (e.g., a well) or subject to a wide temperature swing range (with greater thermal expansion) are disclosed. In an example, a sealing mechanism compensates for volumetric thermal expansion or contraction over a wide temperature range. In the case of an electrowetting cell, by utilizing lateral compensation the sealing mechanism does not adversely affect spacing of optics coupled to, attached to, or assembled with the electrowetting cell.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

Reference now is made in detail to the examples illustrated in the accompanying drawings and discussed below.

The orientations of the electrowetting cells, associated components and/or any complete devices incorporating a cell such as shown in any of the drawings, are given by way of example only, for illustration and discussion purposes. In operation for a particular variable optical processing application, an electrowetting cell may be oriented in any other direction suitable to the particular application of the cell, for example up light or side light or any other orientation. Also, to the extent used herein, any directional term, such as lateral, longitudinal, up, down, upper, lower, top, bottom and side, are used by way of example only, and are not limiting as to direction or orientation of any optic or component of an optic constructed as otherwise described herein.

FIG. 1A is an exploded view of the electrowetting cell 100 depicting components of the cell. As shown, the electrowetting cell 100 includes a reflector 101, sealing plate screws 110A-D, a sealing plate (cap) 120, a cover glass (sealing glass plate) 125, a seal (gasket) 130, a spacer 135, and a light transmissive member 142. The electrowetting cell 100 further includes a lower housing 145, a flexible printed circuit board (PCB) 140, an alignment housing 150, alignment housing screws 160A-D, and a total internal reflection (TIR) lens and cover (holder) 165. An illumination light source, such as light emitting diode (LED) printed circuit board (PCB) assembly 170 and a heat sink 180 are coupled to the alignment housing 150 via LED (heat sink) screws 175A-D and the alignment housing 150 is coupled to the remaining assembly via alignment housing screws 160A-D to hold the stack of components of the electrowetting cell 100 together.

Figure 1B:
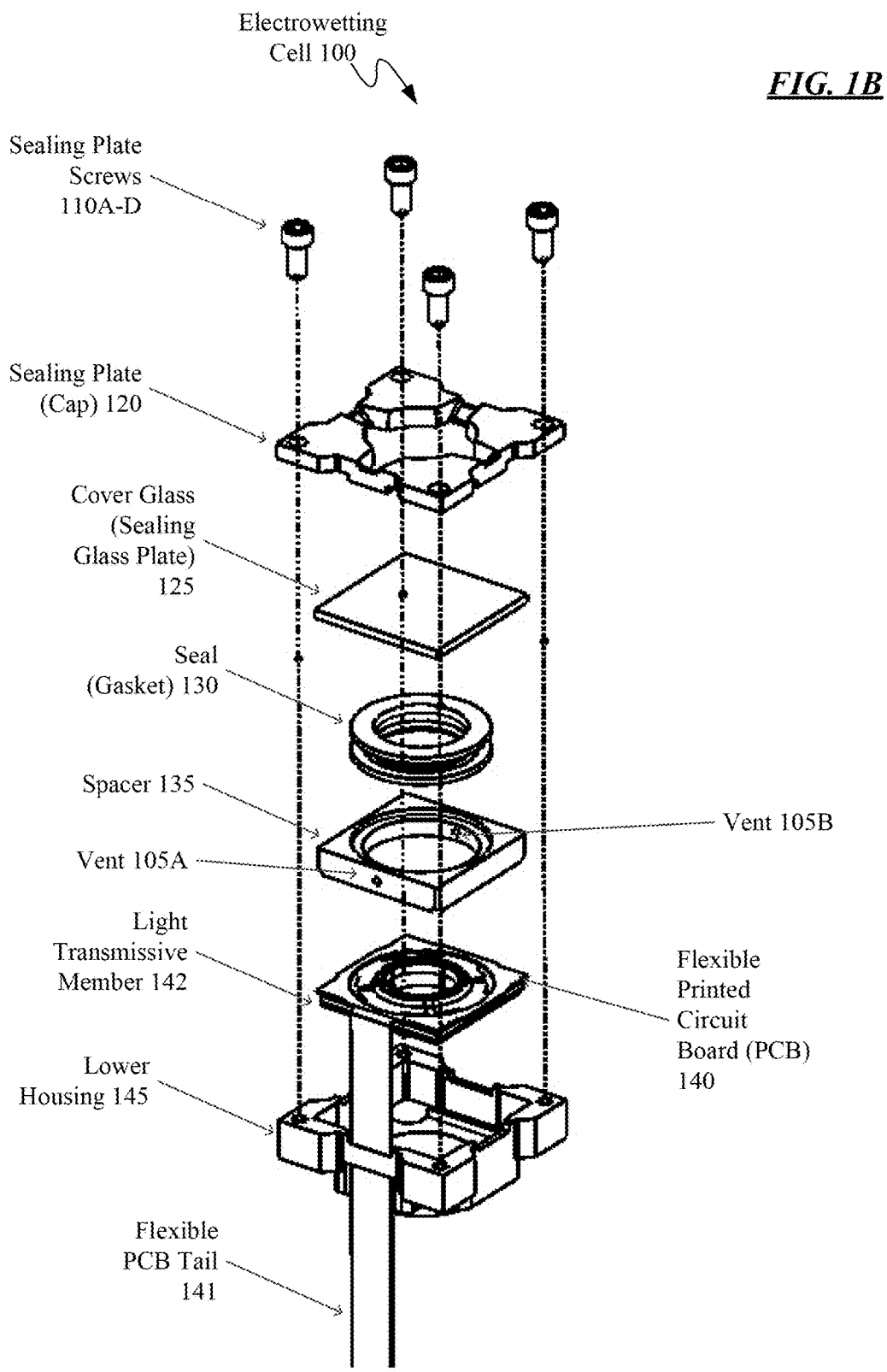
Figure 1C:
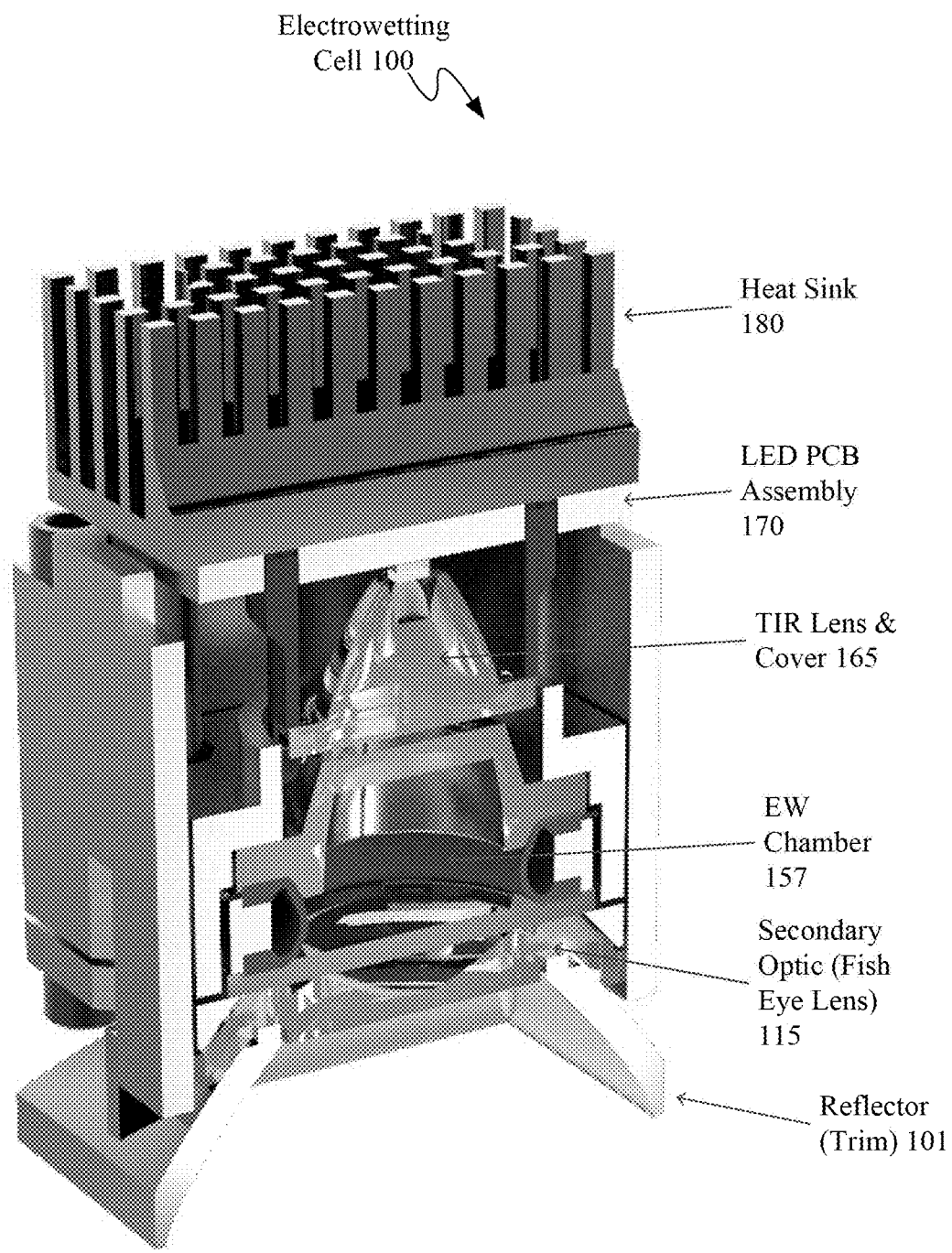
FIG. 1C is a cross-sectional view of an assembled electrowetting cell.
Figure 1D:
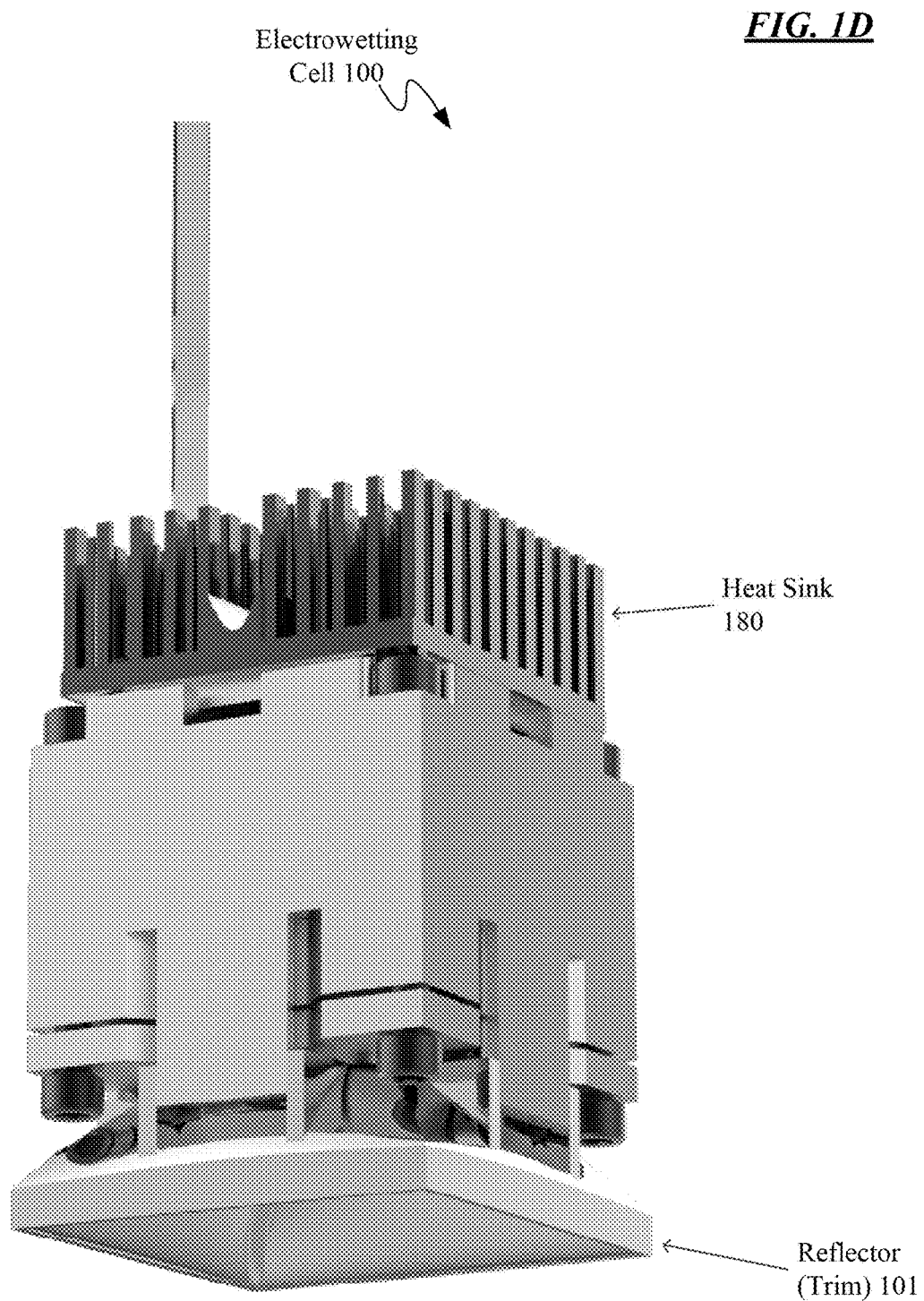
FIG. 1D is a fully assembled electrowetting cell.

It should be understood that the electrowetting cell 100 is shown upside down in the FIGS. 1A-B, 2, and 3 That is, as shown in FIGS. 1C-D, the electrowetting cell 100 is typically suspended from a ceiling or used in device in a reverse orientation where the reflector 101 is facing downwards instead of upwards and the heat sink 180 is facing upwards instead of downwards. FIG. 1B is similar to FIG. 1A, but shows a subset of the components of FIG. 1A in a zoomed in view. Hence, for example, details regarding vents 105A-B that are formed in the spacer 135 are shown. FIG. 1C is a cross-sectional view of the assembled electrowetting cell 100; and FIG. 1D is a fully assembled electrowetting cell 100.

The lower housing 145 houses a light transmissive member 142, such as a glass cell, that includes a well (depicted as electrowetting (EW) chamber 157 in FIG. 1C) that resides in the lower housing 145. The lower housing 145 may be formed of a transparent acrylic or a transparent plastic material; although in the illustrated example, the light transmissive member 142 is made of substantially transparent (e.g. highly light transmissive) glass. The well is located inside the lower housing 145 is enclosed by a substrate, such as the light transmissive member 142 on the bottom, a transparent cover, such as the cover glass 125 on the top, and the seal 130 on the sides. The well is a hollow chamber filled with a liquid and the bottom, top, and sides of the well are enclosed. It should be understood that the electrowetting cell 100 is just one example of a sealed container and the well is just one example of an interior volume of the sealed container which can include liquid(s), gas(es), or both. Generally described, the well is a chamber or vessel that contains liquid(s), gas(es), or both. In an example, the well of the light transmissive member 142 is formed entirely of glass and is filled with water and oil which are immiscible. However, other fluids or gases can be used to fill the well and various materials can be used to form the well, particularly in areas besides the top and bottom which are typically formed of transparent materials to allow for light transparency. For example, a supporting lower substrate can be provided that includes the light transmissive substrate in the optically active area supporting the well, but also includes ceramic or fiberglass in lateral regions that form the outside of the well.

The examples shown generally relate to light transmissive electrowetting cells, that is to say cells that act as lenses and/or prisms and are relatively transparent with respect to light that passes entirely through the optically active area of a given cell. Teachings herein may also relate to reflective electrowetting cells. For a reflective cell, a reflector could either be at one end of the well. In such a reflective example, the cover glass 125 or the member 205 forming the bottom of the well can be reflective instead of transparent material, to provide a reflective electrowetting cell for other types of variable optic applications. Another reflective approach involves forming a reflector at the meniscus forming the interface of the two fluids.

The cover glass 125, seal 130, and spacer 135 are coupled to the light transmissive member 142 of the housing 145 to create a seal around the well and provide lateral compensation. In an example, water and oil fill up the entire volume of the well until where the light transmissive member 142 seals against the cover glass 125 via the seal 130 that is mounted on the spacer 135. In our example, the spacer 135 is formed of bronze to provide an electrical path for the common electrode of the electrowetting cell 100. ITO is deposited on the bottom portion of the cover glass 125 and forms a common electrode which electrically contacts the bronze that forms the spacer 125 and drives the common electrode with a reference voltage conveyed via an upward facing pad formed on the flexible PCB 140. The water and oil are controlled by an electric field that is imparted between the common electrode and the control channel electrodes that is based on an applied voltage. The water (conductive fluid) is driven while the shape of the oil is passively modified based on how the water displaces it.

Separate electrically controllable channel electrodes are formed on the side walls of the light transmissive member 142 to control different portions of the water in the well. Each of the electrically controllable channel electrodes can be formed of aluminum or other suitable material and may be connected to respective dimples (e.g., compressible depressed or raised areas). In an example, the dimples are depressed areas that are downward facing on the flexible PCB 140 to receive a respective drive voltage to apply to a portion of the electrowetting cell 100 via a respective control channel electrode.

It should be noted that dimples can compensate for gaps between the supporting lower substrate side and the flexible PCB 140 or the spacer side and the flexible PCB 140. In an example, the flexible PCB 140 is connected to the circuit connection (e.g., flexible PCB tail 141). The flexible PCB 140 comprises one or more dimples that are compressible raised or depressed areas formed on the flexible PCB 140 to provide electrical contact for the control channel electrode(s) on one side of the flexible PCB 140 or for the common electrode on the other side of the flexible PCB 140. The control channel electrode(s) are formed on the supporting lower substrate side and one or more of the dimples on one side of the flexible PCB 140 provide compressible contact allowing for small gaps between the supporting lower substrate side and the flexible PCB 140 while still maintaining electrical connection. The common electrode is connected to the spacer 135. One or more of the dimples on the other side of the flexible PCB 140 provide compressible contact to the spacer 135 allowing for small gaps between the spacer 135 and the flexible PCB 140 while still maintaining electrical connection through the spacer 135.

During the pre-compressed (relaxed or free) state, the seal 130 bows inwards and as the fluid expands, the seal 130 flexes outwards, where inward and outward are relative to the centroid of the cell. Once compressed, the seal 130 flexes outward slightly into the expansion space (e.g., hollow, space, chamber, pocket, or cavity) formed between where the seal 130 attaches to the spacer 135. To keep the optics of the electrowetting cell 100 consistent, compensation is taken out laterally inside the expansion space as fluid in the well of the light transmissive member 142 expands and contracts as the control channel electrodes are driven by the flexible PCB 140. In contrast to an upwards or downwards moving diaphragm, the lateral movement of the seal 130 has no adverse effect on the optics of the electrowetting cell 100.

As shown in FIG. 1B, vents 105A-B can be formed in the spacer 135 that is positioned inside the lower housing 145 which allows air to pass in and out of the expansion space inside the electrowetting cell 100 to an outside region that is located outside the electrowetting cell 100. The exchange of air between the expansion space and the outside region equalizes pressure thus preventing the buildup of pressure in the expansion space in the example. Instead of compressing air inside of the expansion space during thermal expansion, the air is allowed to flow freely in and out of the electrowetting cell 100. Pressure buildup in the interior volume due to the deformation of the seal 130 may still occur. But additional pressure buildup due to compression of liquid or gas (air in the example), does not occur within the expansion space since the vents allow for flow in and out of the expansion space.

As shown, the shape of seal 130 is round (O-ring), but the shape can be square, rectangular, square, oval, etc. The shape of seal 130 conforms to the shape of the interior volume that is being sealed, in this case the geometry of the EW chamber 157 shown in FIG. 1C such that flex is within material capabilities of the material forming the seal 130. Different membranes will compensate better for gas and some will be better for liquids and for temperature range, fluids, and materials. In an example, the seal 130 is formed of fluoroelastomer (e.g., Viton™ available for example from PAI Inc.), ethylene propylene diene rubber (EPDM), styrene butadiene rubber (SBR), or other thermoset or thermoplastic polymers.

Seal 130 is based on material properties (compression ranges) and the setup is designed for the application that the seal 130 is being incorporated in. For example, if the application uses water with no oil, has relatively little air volume and need for compensation, then the seal 130 may not require much flexibility. If the application is accepting of higher internal pressure, then the thickness and durometer of the material forming the membrane of the seal 130 can be on a higher order to make the seal 130 easier to manufacture. The seal 130 can be a large O-ring assembly for applications in a space shuttle or a smaller O-ring assembly with material characteristics that depend on the fluid or gas application the seal 130 is being utilized with. The fluid or gas inside the interior volume, which is EW chamber 157 in the example, and temperature range may determine the choice of spacing, such as the size of the air gap forming the expansion space between the seal 130 and the spacer 135. The fluid or gas inside the EW chamber 157 and temperature range may also determine the choice of material of the seal 130 and the durometer of the seal 130.

The durometer of the material that forms seal 130 is dependent on environmental factors of a sealed container, particularly well, which is EW chamber 157 in the example. Seal 130 can be a lower durometer material in an application that limits the pressure buildup within the EW chamber 157. Seal 130 can be a higher durometer material in applications where pressure buildup inside the EW chamber 157 is deemed not as critical. Typically, the lower the durometer the softer and more flexible the material forming the seal 130 is.

The spacer 135 maintains distance and mechanically supports the top and bottom of the seal 130. In an example without a spacer 135 being provided, the seal 130 can be U-shaped and is attached via adhesive to each side of the lower housing 145. Alternatively, seal 130 can be a compression seal that is attached via internal bridging component(s), a properly designed single component that is flexible, or overmolded on the lower housing 145. When the seal 130 is glued directly to the lower housing 145 with certain adhesives, the seal 130 may not have actual mechanical sealing forming properties, but the seal 130 can still provide lateral volume compensation. Some adhesives can provide sealing properties, thus even when the seal 130 is adhered to the lower housing 145 without a spacer 135, the seal 130 may still possess seal forming properties.

The reflector (trim) 101 is located adjacent the secondary optic 115. The reflector 101 serves an aesthetic function (closing out the hole in the ceiling plane created by the fixture) and also contributes to the optical system by having the curvature of the reflector 101 interact with the beam being emitted by the rest of the optical system. Hence, reflector 101 can be used in a downlight application and regardless of it being a transmissive or reflective EW system the reflector 101 could still provide glare control, cut off angles, and lines of sight for the end user in the space. The secondary optic 115 can be a fish eye lens, which is a circular component nestled inside the alignment housing 150. The sealing plate screws 110A-D attach the sealing plate 120 which compresses the seal 130 between the cover glass 125 and spacer 135; and between spacer 135 and light transmissive member 142. As an alternative to sealing plate screws 110A-D, snap features, twist locks, glues or other mechanical fastening means can be used.

As shown in FIGS. 1A-B, the flexible PCB 140 has an outer perimeter that is mostly square. Dimples are formed on the flexible PCB 140 for each of the control channel electrodes of the light transmissive member 142 contained in the lower housing 145 for driving a control electrode of the electrowetting cell 100. As explained in more detail later in FIG. 4 below, for example, the dimples follow/align with the peripheral edges of control channel electrodes. In the example, dimples on the bottom of the flexible PCB 140 follow/align with the control electrode pads to convey the electric signals to each channel electrode and/or, if used, on the top of the flexible PCB 140 with spacer 135 to bridge the common electrode connection formed on the cover glass 125. The flexible PCB 140 includes a tail 141, in the example, as an extension of the flexible PCB 140 at one corner of the shoulder of the light transmissive member 142 to connect with external circuitry.

The approximately square section of the flexible PCB 140 has a circular opening aligned with the axis for the well of the light transmissive member 142 inside the lower housing 145 and the openings through the other layers of the electrowetting cell 100. The size of the opening may be approximately the same as the well.

In other instances, the flexible PCB 140 may not include formed dimples. Instead it may be flat. With this sort of condition, electrical connections between the common electrode and the control channel electrodes are made with the flexible PCB 140 still. To enhance the robustness of the electrical connections other provisions can be made. Alternatively, a standard PCB may be used.

Figure 2:
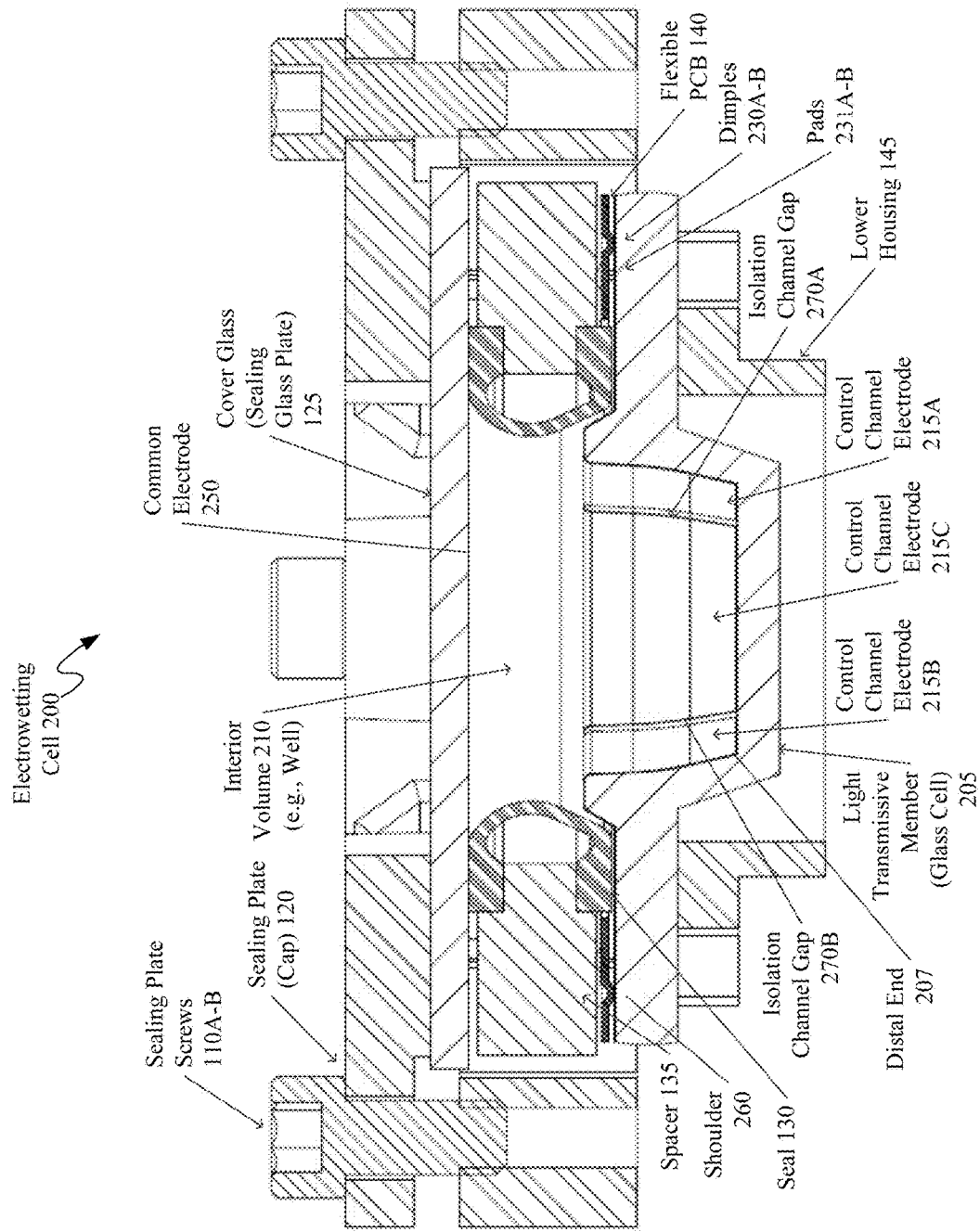
FIG. 2 is a cross-sectional view of a portion of the assembly of the electrowetted cell of FIG. 1 in an uncompressed state.

FIG. 2 is a cross-sectional view of a portion of the assembly of the electrowetting cell 200 of FIG. 1. The cross-section of the electrowetting cell 200 is taken approximately 45° from the front plane and the sealing plate screws 110A-B are in the uncompressed state. As shown, the sealing plate screws 110A-B are engaged in the corners of the sealing plate 120, but not yet fully engaged in the lower housing 145 to compress down. Although only two of sealing plate screws 110A-B are shown, it should be understood that additional screws such as sealing plate screws 110C-D of FIGS. 1A-B are also present on the opposing side of the cross-section. As the electrowetting cell 200 is in the uncompressed state, the seal 130 is shown as bowing inwards relative to the centroid of the cell such that the shape of the seal 130 is convex, that is curving or extending inwards. It should be understood that although sealing plate screws 110A-B are depicted to provide compression of the components of the electrowetting cell 200, compression can be achieved by other mechanisms that are sources of downwards force, such as snap features, twist locks, crimped outer casings, or glue. For example, heat staked plastic posts, ultrasonic welded joints (e.g., plastic pieces), or glass frit features can be used.

The cover glass 125 is positioned between the sealing plate 120 and the spacer 135. A thin layer of indium tin oxide (ITO) is deposited on the bottom surface of the cover glass 125 in order to provide an electric field to drive the fluid or gas in the well 210 of the light transmissive member 205 that sits in the lower housing 145.

The well 210 is an example of an interior volume and has a sealed distal end 207 that is sealed by a light transmissive member 205; and an opening at a proximal end 206 of the well 210 that is sealed by the cover glass 125 on the top and by the seal 130 on the sides. The well also 210 has an electrode landing zone located on a shoulder section 260 of the light transmissive member 205.

In an example, a first fluid, such as oil, is located at the sealed distal end 207 of the well 210 in the volume of the well 210 that is enclosed by the light transmissive member 205 on the bottom. A second fluid, such as water, fills a remainder of the well 210 at the proximal end 206 of the well in the volume of the well 210 that is enclosed by the cover glass 125 on the top and by the seal 130 on the sides. The fluids can be installed in the well 210 before installation of the seal 130 or after. For example, if the seal 130 is a flexible membrane that covers the flexible PCB 140, the prior installation of the seal 130 may provide some protection of the circuit board from the fluids during further assembly.

The two fluids typically exhibit a difference in an optical characteristic, e.g. refractive index and/or reflectivity versus transmissivity. The first (non-conductive, e.g. insulating) fluid may be a suitable oil. Suitable fluids for use as the second (conductive) fluid include alcohols, glycols, ionic liquids, or other suitable liquid materials that can conduct electrical or ionic charges adequately to enable the electrowetting operations described herein. Conducting fluids may contain salts or other additives to alter their electrical conductivities. Specific examples of relatively insulating fluids that may be used include relatively non-conductive 'oil,' liquids such as Dow Corning OS-20, dodecane, and silicone oil. Specific examples of relatively conductive fluids that may be used include aqueous solutions for the more conductive liquid, such as: aqueous mixtures of sodium dodecyl sulfate (SDS), aqueous mixtures of potassium chloride (KCl), and propylene glycol (PG).

The entire light transmissive member 205, does not need to be transparent over all of its surface, as long as the light path through the light transmissive member 205 is transmissive. For example, the light transmissive member 205 could also be made of two parts, a well wall structure (corresponding to tapered section) made of an oxidized aluminum part and a transparent glass piece or other transparent plastic to cover the bottom of the well 210. These two parts can be glued together or bonded/sealed together using other techniques to seal them together to form the member mentioned above to form an optically active area. Additional sections of the member, such as a landing zone on shoulder 260, may be formed integrally with one of the parts of the well 210 (e.g. with the oxidized aluminum wall structure) or formed as separate component(s) and bonded to the respective part (wall or bottom) of the well. The overall light transmissive member 205 may be formed of any number of elements of any variety of suitable materials as long as the distal end 207 of the well is transparent, since other surfaces of the member typically do not influence the optical path.

For purposes of further discussion of an illustrated example, however, we will concentrate on a cell arrangement that utilizes a light transmissive member 205 that is formed of a unified transparent material. The light transmissive member 205, for example, may be a single, solid glass element having a cylindrical or tapered section to form the well 210 and a surrounding shoulder section 260. The example of the shoulder 260 is square, although the shoulder 260 may have other shapes (e.g. round, rectangular, hexagonal, oblong, elliptical, etc.). The well 210 is a hollow chamber formed through the shoulder section 260. The well 210 may be cylindrical or somewhat contoured along its length between the distal end 207 and proximal end 206 of the well 210. In the example, the opening at the proximal end 206 of the well 210 is circular, and the cross sectional shape of the well 210 at various distances along the length of the electrowetting cell 200 is circular (although possibly of different diameters along the length of the well). Other shapes of the opening and/or the well cross-section may be used, e.g. square, rectangular, hexagonal, octagonal, etc. The circular shapes used in the example, however, are suitable for supporting lens and/or prism functions of the cell. A well with such circular shapes may be easier to manufacture, and/or other elements of the cell structure may be easier to assemble.

As shown, the flexible PCB 140 includes dimples 230A-B. The dimples 230A-B are provided on opposing sides of the cross-section of the electrowetting cell 200 to provide electrical contacts. As shown, the dimples 230A-B are protrusions that project downwards. Several dimples besides dimples 230A-B may be included on the flexible PCB 140 that project upwards and/or downwards in opposing directions with respect to each other and in various heights or depths. In the illustration of FIG. 2, dimples 230A-B are in electrical contact with the glass forming the light transmissive member 205. However, it should be understood that during the uncompressed state the dimples 230A-B may be in an open circuit state, such that electrical contact is not provided until the sealing plate screws 110A-B are fully engaged in the lower housing 145.

Although not shown, dimples are formed on top of the flexible PCB 140 for making electrical connection with the common electrode 250 on opposing sides of the flexible PCB 140 and are in electrical contact with the spacer 135. An electrical path for the common electrode 250 is provided from the flexible PCB 140 via the spacer 135. In the example, the spacer 135 has an electrical path which is formed of copper or bronze or any conductive medium, electrically contacts the ITO deposited on the bottom of the cover glass 125 that forms the common electrode 250. The cover glass 125 acts as a top sealing surface as it compresses the top flange of the seal 130. The seal 130 additionally forms a lateral barrier for the well 210 and provides volume compensation.

The light transmissive member 205 includes control channel electrodes 215A-C which electrically connect to the flexible PCB 140 via dimples 230A-B. Pads 231A-B for making electrical connection with the control channel electrodes 215A-C are also formed on opposing sides of the flexible PCB 140. The dimples 230A-B on the bottom of the flexible PCB provide an isolated electrical path the respective control channel electrodes 215A-B. As shown, an isolation channel gap 270A is formed between control channel electrode 215A and 215C to allow regions of the electrowetting cell 200 to be selectively controlled; and an isolation channel gap 270B is formed between control channel electrodes 215B and 215C. The control channel electrode 215C is driven by a separate (third) dimple which is not visible in the cross-section that also projects downwards.

The control channel electrodes 215A-C and the common electrode 250 work together to create an electrical path that passes through the water, thereby inducing an electric field across the dielectric of the cell (including the oil) and wetting the water. That is, the voltage is applied between the control electrodes 215A-C and the common electrode 250. The conductive fluid acts as a conductor in this case and is electrically considered to be an extension of the common electrode 250. The control channel electrodes 215A-C thus create the electrowetting effect. When the amplitude is high enough, the dielectric layer over the control channel electrodes 215A-C has an induced electric field across it that extends across the oil and which will create an electromechanical force at the oil/water interface parallel with the surface of the control channel electrodes 215A-C. This will essentially pull the conductive fluid down the wall and cause it to wet the surface of the control channel electrodes 215A-C.

The voltages are applied to each of the independently controlled channel electrodes 215A-C through the bottom of the flexible PCB 140 and the shared common electrode 250 on the top of the flexible PCB 140. The dimples on the bottom of the flexible PCB 140 follow/align with the control channel electrode pads (e.g., formed on the bottom surface of the lower housing 145) to convey the electric signals to each control channel electrode 231A-C and/or, if used, on the top of the flexible PCB 140 with spacer 135 to bridge the common electrode connection formed on the cover glass 125.

In another example, a flexible PCB 140 can be replaced by either 1) a standard PCB with "x" thickness; or 2) soldering/using conductive adhesive to attach the wires directly to applicable conductors. Soldering/using conductive adhesive may provide any advantage over a standard thickness PCB in that the standard thickness PCB increases the volume of liquids in the EW well and the distance between the optics.

Figure 3:
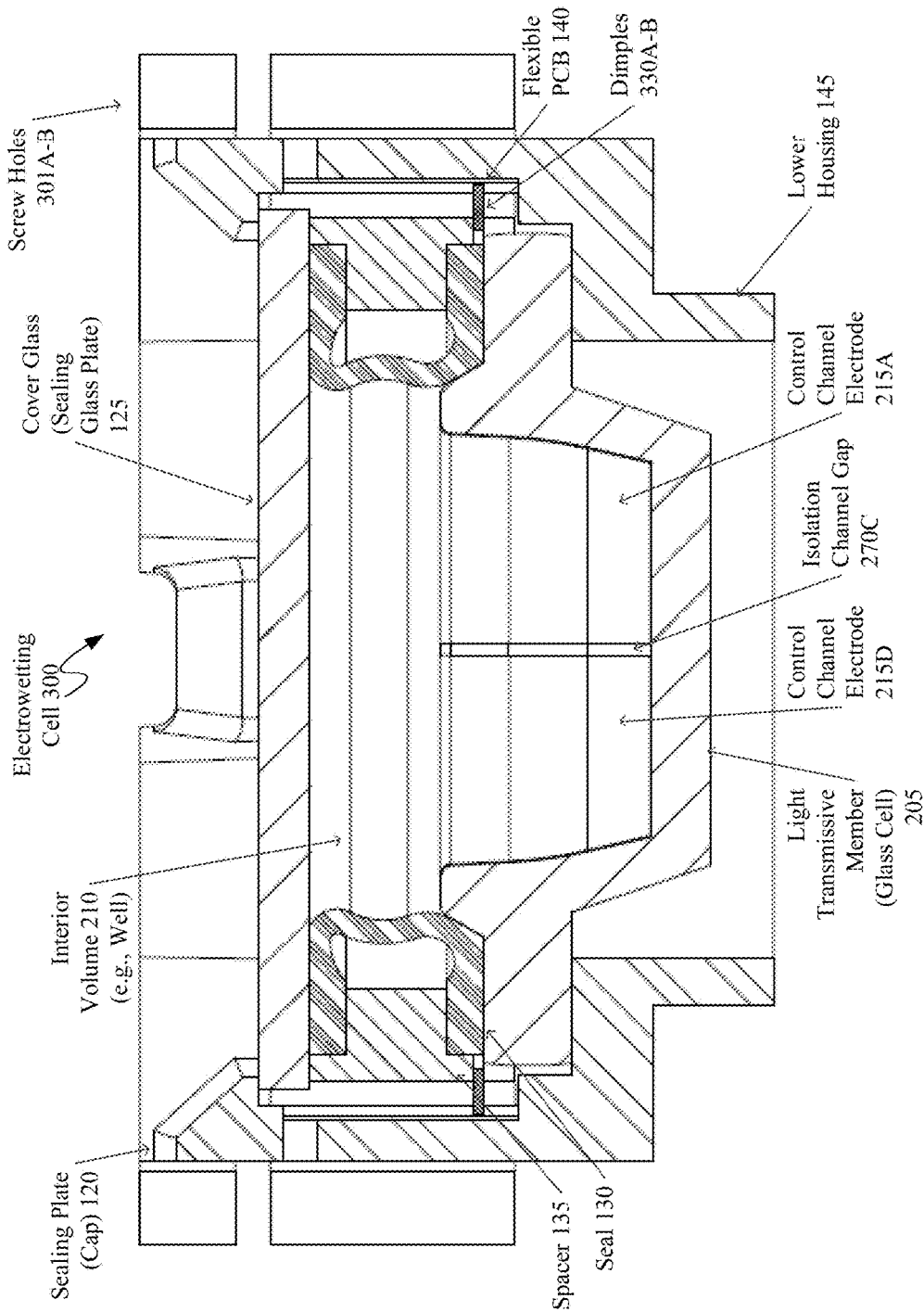
FIG. 3 is another cross-sectional view of a portion of the assembly of the electrowetting cell of FIGS. 1-2 in a compressed state.

In addition a fourth control channel electrode (not shown) is formed in the well 210 on the opposing side of the control channel electrode 215C and the fourth control channel electrode is similar in size to the electrode 215C, but is not visible in the cross-section of the electrowetting cell 200. The fourth control channel electrode is driven by a separate dimple which is also not visible in the cross-section. Two more insulating gaps are formed to electrically isolate the fourth control channel electrode from control channel electrodes 215A-B. Having multiple control channel electrodes 215A-C allows for different regions of the electrowetting cell 200 to be controlled to provide a variety of optical effects, including lens like effects (concave or convex) and a variety or prismatic effects. The fourth control channel electrode, additional isolation channel gap, and a fourth dimple that projects downwards in the uncompressed state to drive the fourth control channel electrode are not visible in the cross-section, but are shown in FIG. 3.

The isolation channel gaps 270A-B have widths sufficient to form isolation channels as empty regions or gaps between the control channel electrodes 215A-C. The widths of resultant isolation channels is sufficient to prevent direct flow of current between the control channel electrodes if/when a voltage difference exists between two adjacent ones of the control channel electrodes 215A-C at the operating voltages typical for a particular electrowetting cell design and expected applications of that cell design. Some parts of the isolation channels or gaps 270A-B may be filled with the dielectric or other insulating material in a later processing step, e.g. to seal out liquids used in the cell and/or provide increased electrical insulation between the control channel electrodes.

The electrode material forming control channel electrodes 215A-C is deposited at least on regions of the light transmissive member 205. Typically, the deposited material covers exposed surfaces of the light transmissive member 205 and is a metal such as Aluminum, gold, or chrome, although other conductors, such as any thin conductive medium, may be used. A metal such as Aluminum would be reflective, although some transparent materials such as Indium Tin Oxide (ITO) may be used. A variety of metal deposition techniques also may be used to deposit the electrode material.

Dimples 230A-B are formed on the flexible PCB 140 for each of the control channel electrodes 215A-C that follow/align with the peripheral edges of electrodes 215A-C and the electrode landing zone on the shoulder 260 of the glass cell forming the light transmissive member 205. The dimples 230A-B have the form of any shape that allows it to protrude from the surface of the flexible PCB 140 in the uncompressed state without separating the electrical connections on either side of the flexible PCB 140 and without creating a connection from the electrical pads on the top side of the flexible PCB 140 to the electrical pads on the bottom side of the flexible PCB 140. The control channel electrodes 215A-C on the bottom of flexible PCB 140 make contact with the pads on the glass structure. The top side of the flexible PCB 140 is a single common electrode that can be split into a plurality of contact pads that makes contact with the spacer 135 to allow for the electrical connection to the common electrode 250 that is coated with some transparent conductor onto the cover glass 125. Typically, there is no connection for the top of the flexible PCB 140 to the bottom of the flexible PCB 140. All 4 channels, in this case, use the common electrode 250 as the common connection to essentially complete the circuit for each. The complete circuit is from the driver through the flexible PCB 140 via traces to the pads with dimples that connect to the pads on the glass cell that are part of the control channel electrodes 215A-C. The conductive fluid within the cell is in contact with the ITO on the cover glass 125 which makes contact with the spacer 135 which makes contact with the dimples on the top side of the flexible PCB 140 to complete the common portion of the circuit. The common electrode 250 is then routed back through the flexible PCB 140 via a trace to the driver.

The traces may extend from the tail of the flexible PCB 140 toward the dimples 230A-B and pads 231A-B, across either surface of the flexible PCB 140. The traces in the example connect to the dimples 230A-B on the surface of the flexible PCB 140 facing the control channel electrodes 215A-C and the pads 231A-B on the surface of the flexible PCB 140 facing the common electrode 250. The traces can be through vias in the insulating substrate of the flexible PCB 140. The lead traces and the dimple contacts 230A-D provide electrical connectivity to the control channel electrodes 215A-C; and the lead traces and pads 231A-B provide electrical connectivity to the common electrode 250.

A dielectric layer, covers control channel electrodes 215A-C on the portions of the interior wall surfaces of the well 210 and on some portion, but not all of control channel electrodes 215A-C on portions of the shoulder 260, known as the electrode landing zone. The glass cell forming the light transmissive member 205 has an indentation in the form of a ring surrounding the opening of the well 210. This indentation allows the seal 130 to be recessed relative to the EW cell 200 fluids which contributes to minimizing the excess fluids required to fill the system.

The metal forming the control channel electrodes 215A-C follows the contour of the glass so that there is still an annular indentation surrounding the opening of the well 210. The material of the dielectric layer also fills portions of the isolation channel gaps 270A-B that are within the well and within the boundary of the annular indentation. Although not shown, dielectric material may also be applied to fill the remainder of the isolation channel gaps 270C-D.

In an example, the dielectric layer also is hydrophobic. For optical applications of the electrowetting cell 200 in which light may pass through the well 210 and possibly other portions of the electrowetting cell 200, the dielectric also is transparent. An example of a suitable material is Parylene C, Parylene HT, or other inorganic options, although other dielectric materials may be used. The Parylene C or other dielectric material may be applied to form the dielectric layer in a variety of different ways.

FIG. 3 is another cross-sectional view of a portion of the assembly of the electrowetting cell of FIGS. 1-2 in a compressed state. The cross-section of the electrowetting cell 300 is parallel to the front plane and thus rotated by approximately 45° from the cross-section shown in FIG. 2. Although the sealing plate screws are not shown, the electrowetting cell 300 is in the compressed state in which the sealing plate screws are engaged in the corners of the sealing plate 120 via screw holes 301A-B and fully engaged in the lower housing 145 to compress down. Because the electrowetting cell 300 is in the compressed state, the seal 130 is shown as bowing outwards relative to the centroid of the cell such that the shape of the seal 130 is concave. This shape is used for demonstrative purposes only and may vary from what is shown depending on the fluids and EW cell 300 geometry. During operation of the electrowetting cell 300, the seal 130 may change shape based on heat, that is thermal expansion or contraction.

Dimples 330A-B of the flexible PCB 230 are on opposing sides of the cross-section 300 to provide electrical contacts. The flat shape that is shown is the section of the flexible PCB 230 without dimples. The light transmissive member 205 includes control channel electrodes 215A and 215D which electrically connect to the flexible PCB 140 via dimples 330A-B respectively. In the compressed state illustration of FIG. 3, dimples 330A-B no longer have a convex shape and are flattened to close the circuit and form electrical contact with the glass control channel electrodes 215A and 215D formed on the light transmissive member 205.

The dimples 330A-B on the bottom of the flexible PCB 140 provide an isolated electrical path to the respective control channel electrodes 215A and 215D. As shown, an isolation channel gap 270C is formed between control channel electrode 215A and 215D to allow regions of the electrowetting cell 300 to be selectively controlled.

FIG. 4 depicts components of the flexible PCB 140. As shown, the flexible PCB 140 includes twelve dimples, and three dimples are located on each of the four corners 421-424 of the flexible PCB 140. Although a certain number of dimples are shown in the example, it should be understood that the number of dimples can be more or less depending on specific structural and electrical requirements of the particular electrowetting cell design/application.

In the example, the flexible PCB 140 is a 2-sided flexible circuit board. The control channel electrodes on the bottom of flexible PCB 140 make contact with the pads on the glass structure. The top side of the flexible PCB 140 is a single common electrode split into 4 sections that makes contact with the spacer. There is no connection for the top of the flex to the bottom of the flex, in this example. All 4 control channels, in this case, use the common electrode as the common connection to essentially complete the circuit for each.

The first corner 421 includes three dimples 406-408 on the bottom that project downwards to provide an isolated electrical path to a respective control channel electrode in the region of the first corner 421. Hence, the dimples 406-408 on the bottom of the flexible PCB 140 convey a control channel voltage to drive the respective control channel electrode that is in the region of the electrowetting cell near the first corner 421.

Similarly, the other corners 422-424 include respective dimples 409-411, 412-414, and 415-417 on the bottom that project downwards to provide an isolated electrical path to a respective control channel electrode in the region of the respective corners 422-424. Hence, the dimples 409-411, 412-414, and 415-417 on the bottom of the flexible PCB 140 convey a control channel voltage to drive the respective control channel electrode that is in the region of the electrowetting cell near the respective corner 422-424.

As explained earlier, pad(s) (not shown) in respective corners 421-424 form electrical contact with the spacer (not shown) to form a circuit that is an electrical path to electrically interconnect with the ITO deposited on the bottom of the cover glass (not shown) that forms the common electrode (not shown).

In an example, the flexible PCB 140 can have two layers of copper pads/traces—the side closest to the EW cell contains four pads for the control channel electrodes while the opposite side has pads for the common electrode which makes electrical connection to the spacer and then the ITO on the cover glass. Voltage is applied across the independently addressed control electrodes and the common electrode to create the electrowetting lensing effect.

Hence, the voltages conveyed by dimples 409-411, 412-414, and 415-417 are applied to a respective control channel electrode along with the reference voltage conveyed by pad(s) (not shown) to the common electrode (not shown). This creates four different capacitors that apply an electrical field to control the movement of the fluid or gas in various regions of the electrowetting cell.

Although the shape of the flexible PCB 140 is square with four corners for controlling each of the four control channel electrodes of the electrowetting cell, it should be understood that the shape may vary depending on the application. For example, fewer or more dimples may be provided depending on the number of control channel electrodes in the electrowetting cell. Moreover, although the number of regions in the electrowetting cell is the same as the number of control channel electrodes, the numbers may diverge depending on the application.

Due to tolerance issues, the bottom side of a conventional circuit board does not always make electrical contact with an electrode. The flexible dimples 406-417 on the flexible PCB 140 avoid difficulties in finding electrical connections on the top and the bottom of the flexible PCB 140 that is being compressed inside an electrowetting cell or other environment. The flexible dimples 406-417 are each regions of the flexible PCB 140 having a curvature in a respective region. Dimples 406-417 can be formed using die cut tooling having protruding features to form the desired shape, for example In the case of an electrowetting cell, the flexible PCB 140 is sandwiched by lower and upper layers. The lower layer is situated below the flexible PCB 140 and is a light transmissive member which has an electrical path to control channel electrodes. The bottom side of the flexible PCB 140 thus needs to make electrical contact with the light transmissive member (not shown). The upper layer is situated above the flexible PCB 140 and is a spacer (not shown). Once compressed by the spacer, the dimples 406-417 are compressed and can guarantee that the bottom side of the flexible PCB 140 makes electrical contact with the electrical path to the control channel electrodes of the light transmissive member. Without the dimples 406-417 on the bottom side of the board, the flexible PCB 140 may not make electrical contact with the light transmissive member.

The dimples 406-417 can be formed as two compressions facing one direction and another compression facing an opposite direction in the four corners 421-424 of the flexible PCB 140. For example, dimples 406, 407, 408 are formed as upwards or downwards projections of a predetermined depth or height (raised) depending on various manufacturing tolerances, which can be a +/− percentage. In other words, the dimples 406-417 are formed as depressions or raised areas on the flexible PCB 140 that are flexible electrical contacts. Because the dimples 406-417 are flexible, the compression fitting of an electrowetting cell or other structure pushes dimples 406-417 downwards to make electrical contact with the light transmissive member. As dimples 406-417 are compressed, the depressions or raised areas forming dimples 406-417 on both sides of the flexible PCB 140 become compressed to take up any manufacturing tolerance discrepancies.

In the example, the flexible PCB 140 is double sided. Each side has 4 exposed electrical pads. The pattern for the 4 pads is the same on the top and bottom of the flexible PCB 140. In the dimpled design the corners, where the pads reside, are deformed to create dimples. For each pad, there is at least one dimple facing up and one facing down. In the example given, there are two up and one down. The pads on the top of the flexible PCB 140 all connect with the common part of the circuit which is the ITO on the over glass. The pads on the bottom each connect with one of the control electrodes on the light transmissive member.

The dimples 406-417 on the flexible PCB 140 can have three different geometries in each corner 421-424. For example, the dimples 408, 411, 414, and 417 are formed as embossed depressed areas to connect to control electrodes and the dimples 406, 407, 409, 410, 412, 413, 415, and 416 are formed as embossed raised areas to ensure electrical contact with spacer 135. Hence, the four corners 421-424 of the flexible PCB 140 provide electrical contacts and lay on top of the light transmissive member 205. The spacer (not shown) is compressed down by the sealing plate screws (not shown). Because of the different manufacturing tolerances (e.g., thickness or thinness) of the cover glass, light transmissive member, and other components in the stack (e.g., forming an electrowetting cell) or other device (e.g., IoT device), the total distance+/−tolerance of the dimples 406-417 can be greater than any possible difference in the stack of components. Thus, the dimples 406-417 ensure good electrical contact is achieved by the flexible PCB 140.

In an example, no dimples are formed on the flexible PCB 140, but the same or a similar assembly is utilized. For example, the dimples 406-417 can be replaced with 1) pogo pins soldered/press fit into the spacer 134; 2) coil spring(s) placed in the spacer 135 (e.g., via thru holes or blind holes that allow the springs to make contact with only the flexible PCB 140); 3) spring steel formed springs that snap around the spacer and have teeth that make electrical contact with both the ITO on the cover glass and the top side of the flexible (PCB in this case the spacer may not need to be made out of a conductive material); or 4) apply z-axis or other conductive tapes/gap fillers to the surface of the conductors. Such mechanisms improve the electrical connections/tolerance stack up of the design.

FIG. 5A is a perspective view of an assembled electrowetting cell 500. As shown, the electrowetting cell 500 includes a vent 505A that is formed as an opening or hole in a side wall 501A of the spacer 135. A cross-section of the electrowetting cell 500 that includes the vent 505A is taken between the side walls 501A-B and is shown in FIGS. 5B-D. The vents 505A-B are openings, holes, or pipes that provide a passage or a conduit from the expansion space 510 to an outside region 570 that resides outside the electrowetting cell 500 or ambient for pressure equalization purposes. The vents 505A-B exchange a compensating medium between the expansion space 510 of the electrowetting cell 500 and the outside region 570 or ambient during thermal expansion and contraction. It should be understood that although expansion space 510 is depicted and illustrated as two separate and distinct spaces, when the seal 130 is circular and the space in the back is a continuous circle, the expansion space 510 actually collectively forms one contiguous space. Hence, the expansion space 510 can be a continuous space or divided spaces. In FIGS. 5B-D, two vents 505A-B are shown in the cross-section, such that each of the vents 505A-B are located on opposing side walls 501A-B of the spacer 135 that forms the electrowetting cell 500. It should be understood that one, three, or any number of vents can be utilized. The vents 505A-B allow air to pass in and out of a respective expansion space 510 formed in the electrowetting cell 500 to prevent pressure from building up inside of the expansion space 510 of the electrowetting cell 500. The expansion space 510 is a hollow chamber or pocket that is formed around the electrowetting cell 500 that comprises the empty space or volume between where the seal 130 is attached, coupled, joined, or mounted to the spacer 135.

As the electrowetting cell 500 is operated, the seal 130 moves laterally by expanding and contracting to compensate for thermal expansion or contraction of the fluid or gas residing inside the interior volume 210 (e.g., well). The vents 505A-B stop a compensating medium, such as air, from becoming compressed inside the expansion space 510 during thermal expansion and contraction when the electrowetting cell 500 is being operated. Accordingly, the compensating medium, such as air, inside of the expansion space 510 is allowed to flow freely in and out.

Of note, the compensating medium that the vents 505A-B compensate for can be gases, such as air, or fluids, such as water. For example, when the electrowetting cell 500 is embodied in an underwater lighting application, water flows in and out of vents 505A-B that can be pinhole sized to equalize pressure inside and outside of the expansion space 510.

The cross-section shown in FIG. 5B is prior to compression and sealing of the electrowetting cell 500 of FIG. 5A. The cross-section shown in FIG. 5C is after compression and the electrowetting cell 500 is sealed. The cross-section shown in FIG. 5D is during operation of the electrowetting cell 500 with an expanded internal fluid volume due to temperature rise of the electrowetting cell 500.

As shown in FIGS. 5B-D, the seal 130 is mounted and manufactured in a manner that prevents up and down movement and is forced to provide lateral compensation during operation of the electrowetting cell 500. In the example, the seal 130 compensates for thermal expansion of fluids (e.g., oil and water) where oil has a greater expansion coefficient, but it should be understood that the seal can compensate for a variety of liquids or gases in a lateral manner.

More generally, the seal 130 laterally compensates for a sealed chamber that has gas or liquid inside and compensates for thermal expansion of the gas or liquid inside the sealed chamber relative to the outside region 570.

The size of the air or fluid volume of the expansion space 510 is designed in a manner that is suitable to compensate for a certain temperature range of fluid or gas in the sealed chamber. In the example of FIGS. 5B-D, the expansion space 510 is designed to suit the temperature range of the fluid inside the sealed interior volume 210 of the electrowetting cell 500. The shape and thickness of the seal 130 is likewise designed for the application.

The seal 130 is a flexible material that surrounds and has an opening centered about the proximal end of the interior volume 210. Although other shapes of the seal 130 may be used, the example shown uses a flexible membrane as the seal 130. The flexible seal 130 is a molded O-ring with a certain geometric profile and varying wall thickness to optimize the sealing capability of the top and bottom sections (the thicker sections) while minimizing the wall thickness of the middle (curved section) to allow for minimal pressure build up.

Compression of the seal 130 improves the fluid tight sealing of fluids or achieves hermetic sealing within the well implemented by the seal 130. For example, the seal 130 is formed of a molded O-ring or suitably shaped rubber or similar material that is inert with respect to the materials of the electrodes and the fluids and is sufficiently compressible. An example of a suitable flexible material is Viton™ available for example from PAI Inc., although other rubber-based or flexible plastics may be suitable.

Alternatives to the flat membrane design of the seal 130, include for example, one or more O-rings or C-rings, formed of a suitable material. An O-ring, C-ring or other alternative form of the seal 130 can still be located around the perimeter of the interior volume 210.

FIGS. 6A-C are views of cross-sections of an assembled electrowetting cell of FIG. 5A. The cross-sections of electrowetting cells 600A-C are taken between side walls 501C-D along the line A-A of the electrowetting cell 600 which is rotated by approximately 90° from the cross-sections of FIGS. 5B-D. Accordingly, the cross-sections of the electrowetting cells 600A-C do not depict the vents 505A-B shown in FIGS. 5B-D because side walls 501C-D do not contain vents, although depending on the design the side walls 501C-D can contain additional or fewer vents, for example, the electrowetting cell 600 can contain one vent, three vents, five vents, etc.

The cross-section of the electrowetting cell 600A shown in FIG. 6A is pre-assembly and prior to compression and sealing of the electrowetting cell 600 where the seal 130 is in an arc-shaped state (convex) and flexing inwards towards the interior volume 210. The cross-section of the electrowetting cell 600B shown in FIG. 6B is after assembly with compression and the electrowetting cell 600 is sealed and the seal 130 is in a relatively flat state (slightly concave) compared to the un-compressed and pre-assembled state. The cross-section shown in FIG. 6C is during operation of the electrowetting cell 600C with an expanded internal fluid volume due to temperature rise of the electrowetting cell 600C.

As shown in FIG. 6C, the seal 130 is in a very deformed state (very concave) where the seal 130 occupies extra volume in the expansion space 510 by flexing outwards towards the expansion space 510. Hence, the gasket membrane of the seal 130 that encloses the interior volume, such as well 210, deforms laterally (sideways) along the horizontal axis such that the membrane bends to occupy the space that was previously occupied by the adjacent expansion space 510.

The seal 130 may be formed of rubber and seal between two opposing surfaces, such as upper substrate 550 and lower substrate 555; and also seal between an interior volume, such as well 210, and expansion space 510. The upper substrate 550 can be a cover glass and the lower substrate 555 can be a light transmissive member. The expansion space 510 provides space for a volumetric change ratio of the seal 130 (e.g., thermal expansion and contraction) and are separated via the interior volume 210. The compression part of the seal 130 is designed with an appropriate durometer (i.e., hardness of the material) and to operate within the range of temperature changes resulting in the interior volume, such as well 210.

The upper substrate 550 and lower substrate 555 can be two opposing substrates formed of glass, ceramic, plastic, acrylic, metal, and/or combination thereof that are coupled to the spacer 135, for example, by being clamped or compressed down on spacer 135. In our electrowetting cell 600A-C examples, the upper substrate 550 can be the cover glass 125 and the lower substrate 555 can be the light transmissive member 205 shown in FIGS. 1-3. When thermal expansion occurs in the interior volume 210, the size of the expansion space 510 reduces based on outwards lateral compensation movement provided by the membrane of seal 130.

When thermal contraction occurs in the interior volume 210, the size of the expansion space 510 increases based on inwards lateral compensation movement provided by the membrane of seal 130. In addition, the two vents 505A-B shown in FIGS. 5A-D are used to equalize pressure buildup within the expansion space 510 during thermal expansion of the interior volume 210 by allowing gas (e.g., air) or fluid to escape to an outside region 670 (chamber D) that is located outside of the electrowetting cells 600A-C via the vents 505A-B. Hence, the outside region 670 is connected to the expansion space 510 via the vents 505A-B and the expansion space 510 equalizes pressure inside by releasing excess air or fluid pressure via the vents 505A-B to the outside region 670.

Alternatively, if no ambient air or water is desired in the expansion space 510, no vents are formed in the spacer 135 and a second seal membrane (not shown), for example, formed of rubber, can be joined to the opposing side of the spacer 135 where the seal 130 is mounted in order to seal the outside region 670 from the expansion space 510. Sealing the expansion space 510 can allow the electrowetting cells 600A-C to be submersible in water. In order to prevent the electrowetting cells 600A-C from being exposed to water, the expansion space 510 is filled with air because air has different thermal expansion properties and movement compared to water. When the expansion space 510 is sealed by the second seal (not shown), air is trapped inside and the expansion space 510 pressurizes at a higher level internally. Depending on the application, a pressure equalization port (not shown) can be provided depending on the displacement factors or pressure characteristics of the interior volume 210 and expansion space 510. The pressure equalization port can have a different form factor with a bottom out feature that does not adversely affect the optics of the electrowetting cells 600A-C.

The size of seal 130 is typically limited based on usability and its thermal expansion. For example, when the size of seal 130 is too large, then the expansion space 510 becomes too small which results in insufficient room for the seal 130 to expand laterally outwards in the expansion space 510. Accordingly, the size of the expansion space 510 may be made larger.

FIG. 7A depicts a perspective view of a seal 730A mounted on a spacer 735 and compressed during operation of a sealed container 700. As shown, the seal 730A is C-shaped along its length and is shown in a state of thermal expansion after assembly and during operation of an electrowetting cell. In the configuration, the spacer 735 includes vents 705A-B to exchange the compensating medium with the outside region 770 during thermal expansion.

The seal 730A can be coupled to and housed within a sealed container 700 that maintains fluids or a gases that are subject to thermal expansion. The sealed container 700 is formed by a first surface, such as upper substrate 750, positioned on a first side 780A of a spacer 735 with the seal 730A attached thereto, an interior volume 790 containing fluid(s) or gas(es) having an opening that abuts to a second side 780B of the spacer 735, and the first surface 750 and the interior volume 790 are compressed to sandwich the spacer 735 and seal 730A there between to form the sealed container 700. The spacer 735 and the seal 730A have a center opening that interfaces with the interior volume opening.

The spacer 735 has milled out areas to form shelves, which include upper shelf 792 and lower shelf 794 in the example. The seal 730A is mounted around the interior diameter of the spacer 135 by attaching flanges 791, 793 of the seal 730A to corresponding recessed shelves 792, 794 formed on the spacer 735. When the seal 730A is inserted into the spacer 735, the upper flange 791 sits on the upper shelf 792 and the lower flange 793 sits on the lower shelf 794 close off the interior volume 790 from the expansion space 710.

A lateral pressure compensation structure may be built into the spacer 735 that allows the fluid or gas in the container to expand. The lateral pressure compensation structure utilizes the spacer 735 with a center opening. The perimeter of the center opening is hollowed such that a C-shaped membrane of the seal 730A fitted into the center opening may deform under pressure due to the thermal expansion of the fluid or gas and fill the hollow around the center opening. The spacer 735 includes vents 705A-B to exchange the compensating medium (e.g., fluid(s) or gas (es)) filling the expansion space 710 of the sealed container 700 with the outside region 770 during thermal expansion.

Figure 7B:
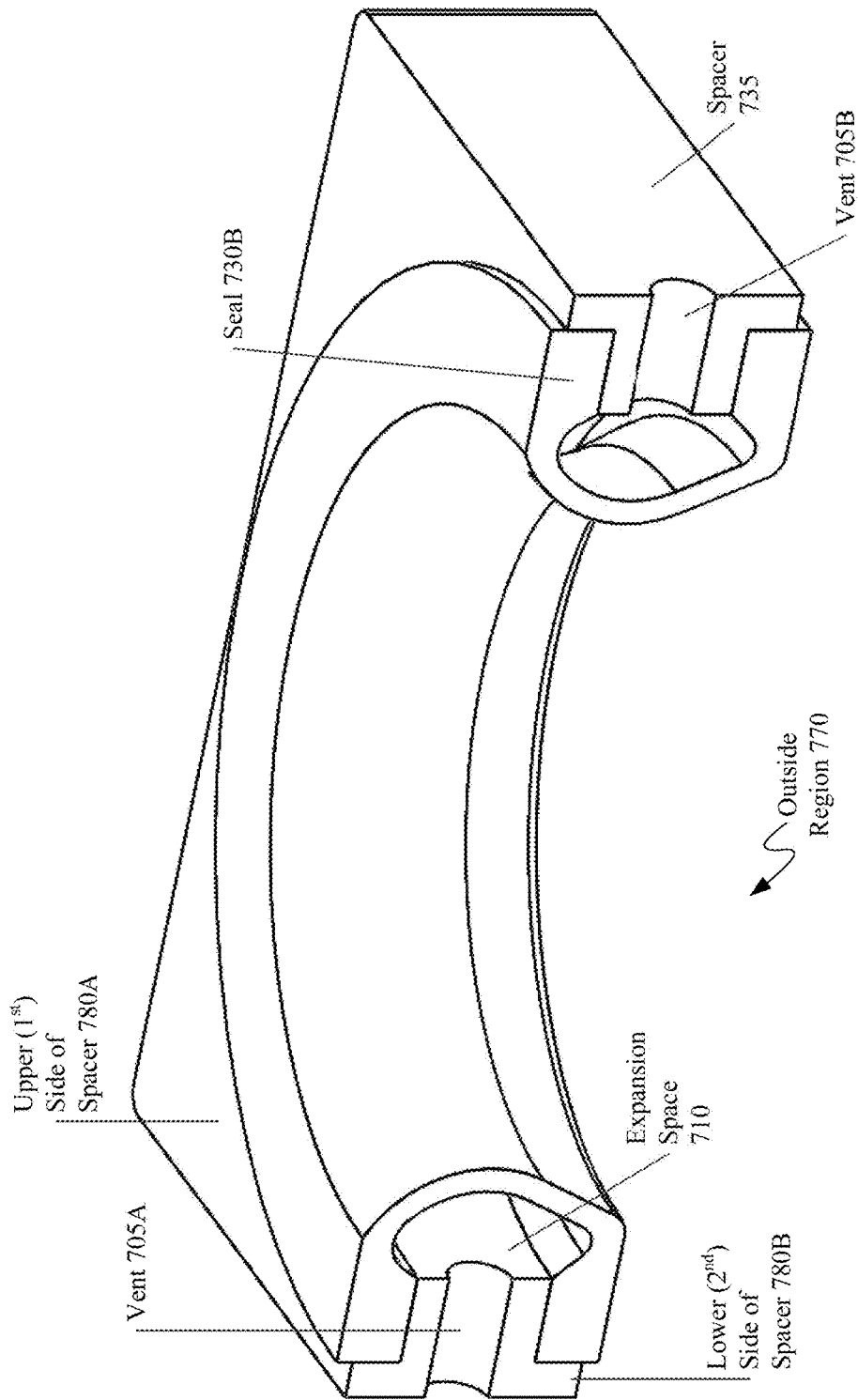
FIG. 7B depicts another perspective view of a seal in an uncompressed state mounted on a spacer.

FIG. 7B depicts another perspective view of a seal 730B in an uncompressed state mounted on a spacer. The seal 730B is C-shaped along its length and is shown prior to assembly in an electrowetting cell. In the configuration, the spacer 735 includes vents 705A-B to exchange the compensating medium filling the expansion space 710 with the outside region 770 during thermal expansion. The seal 730B can be coupled to and housed within a sealed container that maintains fluids or a gases that are subject to thermal expansion like that of FIG. 7A.

Figure 7C:
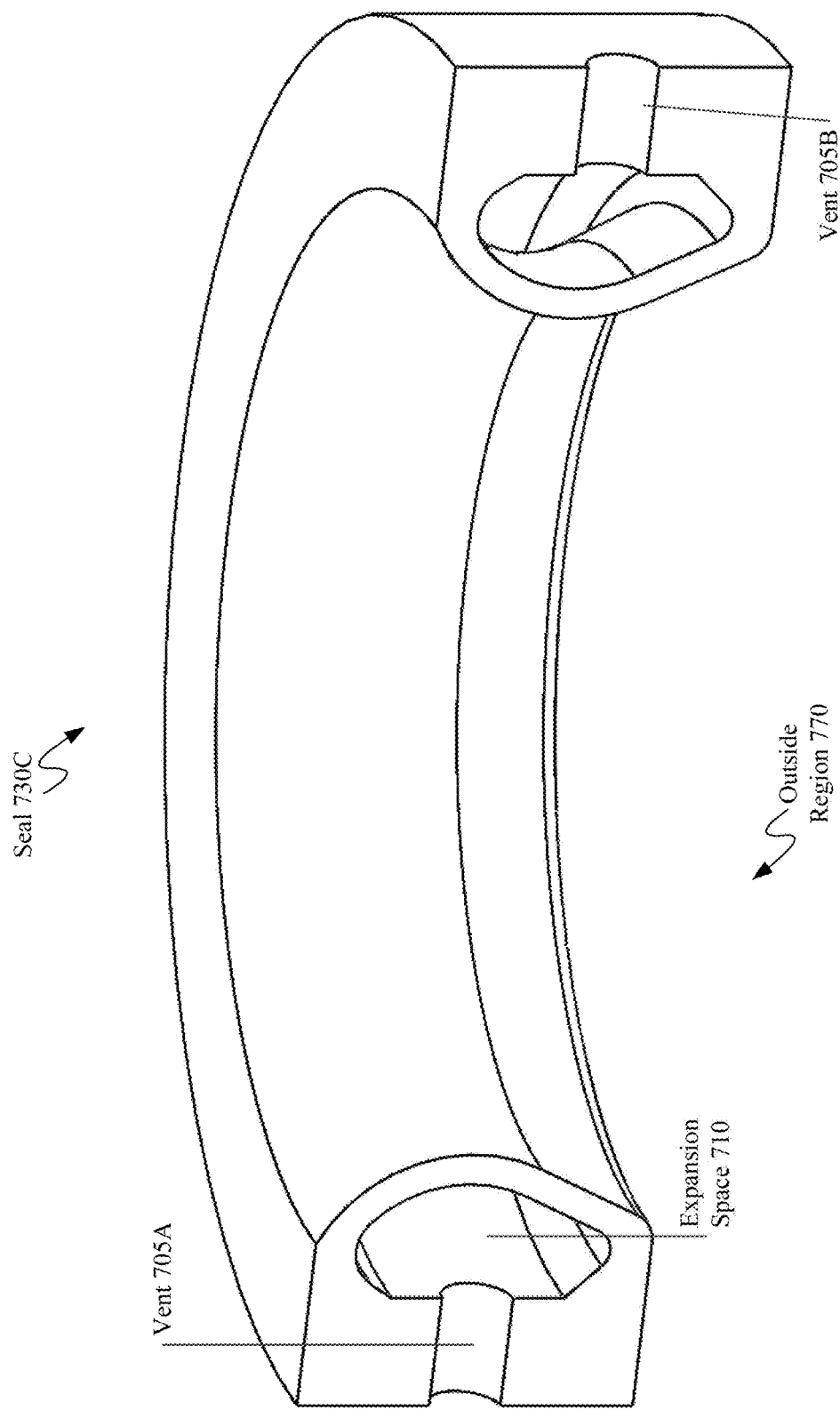
FIG. 7C depicts another perspective view of a single component solution without the spacer.

FIG. 7C depicts another perspective view of a seal 730C in an uncompressed state without being coupled to a spacer. As shown, the seal 730C is C-shaped along its length and is shown in prior to assembly in an electrowetting cell. In the configuration, a spacer is not utilized and the seal 730C is a single component, hence the seal 730C itself has built-in vents 705A-B to exchange the compensating medium with the outside region 770 during thermal expansion. The seal 730C can be coupled to and housed within a sealed container that maintains fluids or a gases that are subject to thermal expansion like that of FIG. 7A.

Figure 8A:
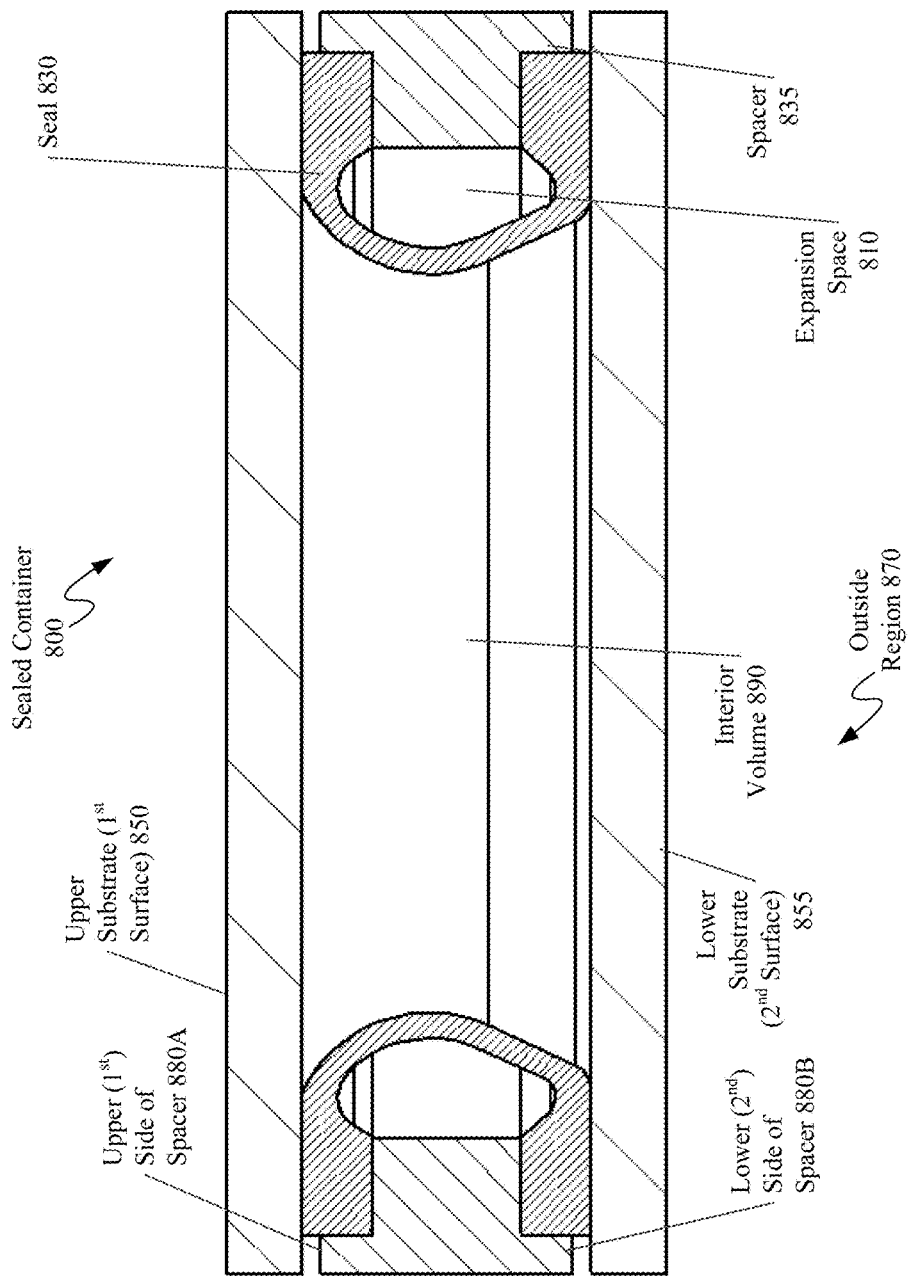
Figure 8C:
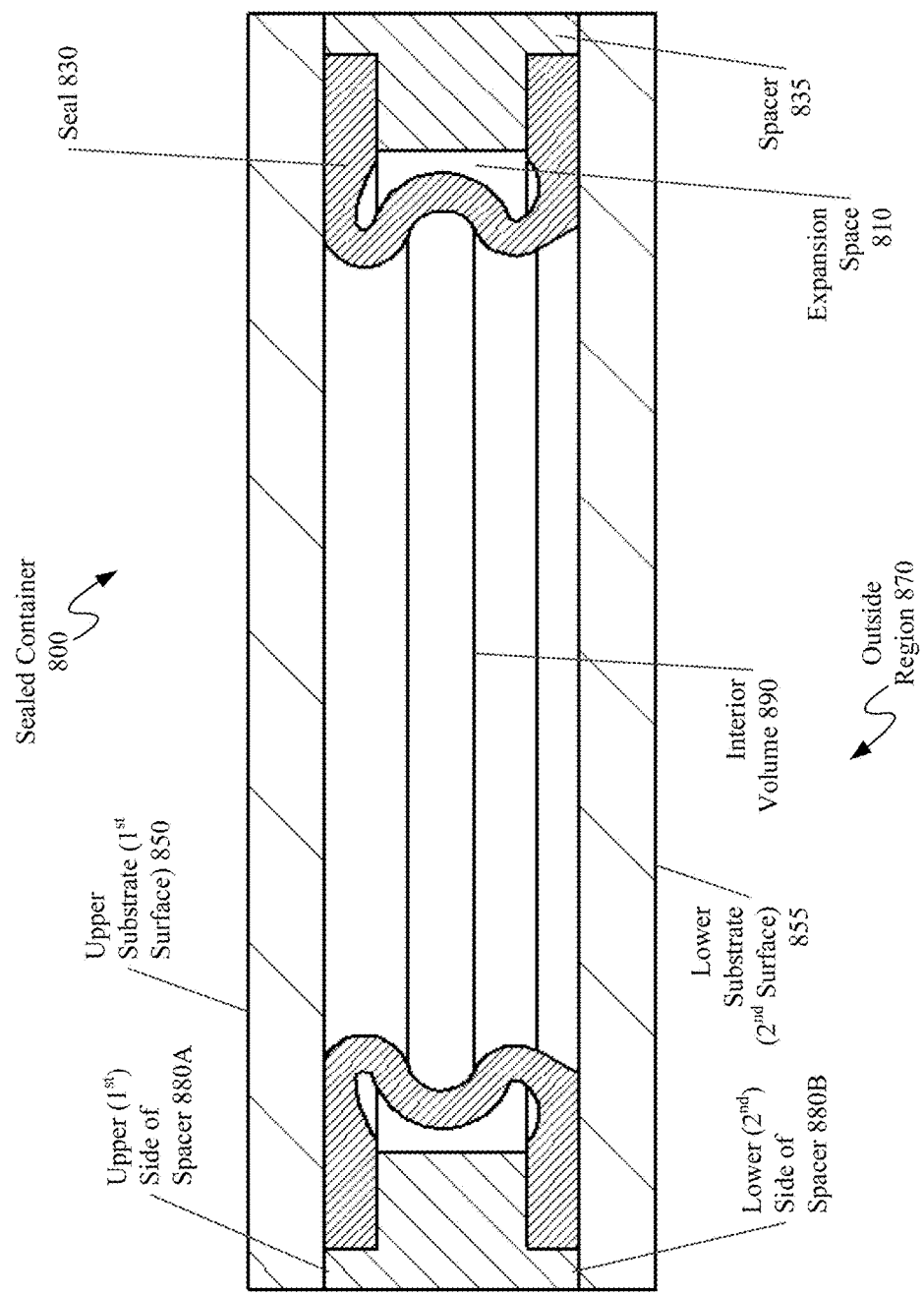

FIGS. 8A-C depict cross-sectional views of a sealed container 800 that includes a seal 830 mounted on a spacer 835, where the seal 830 is sandwiched between first and second surfaces, such as upper substrate 850 and lower substrate 855, during thermal expansion and contraction to provide a lateral pressure compensation structure. In FIG. 8A, the seal 830 is mounted on the spacer 835, but is not yet compressed to form a tight seal. As noted earlier, sealing plate screws can provide compression of the components of the sealed container 800, but compression can be obtained by other mechanisms, such as snap features, twist locks, crimped casings, or glue.

As shown in FIGS. 8B-C, the sealed container 800 is in a compressed state as a result of the sealing plate screws being fully engaged, thus some deformation of the seal 830 is shown. But the liquid(s) or gas(es) stored in the interior volume 890 have not yet been driven to the point of thermal expansion or contraction during FIG. 8B. However, in the depiction of FIG. 8C, the interior volume 890 of the sealed container 830 is subjected to thermal expansion. Hence, the seal 830 deforms laterally into the expansion space 810, such that the seal 830 provides a lateral pressure compensation structure.

Vents are not shown in FIGS. 8A-C because the views are rotated by 90° relative to the views of FIGS. 7A-C where the vents are visible. However, it should be understood that vents may be present to provide for pressure equalization between the expansion space 810 of the sealed container 800 and the outside region 870.

FIGS. 9A-C depict perspective views of the cross-section of an assembly of an electrowetting cell 900 that includes sealing plate screws 910A-B, a sealing plate (cap) 920, a sealing glass plate (cover glass) 925, a seal 930, a spacer 935, and a light transmissive member 905. The electrowetting cells 900A-C further include a lower housing 945 and a flexible PCB tail 941. In the depiction of FIG. 9A, control channel electrodes 915A-B reside inside a well 910. In FIG. 9B, the electrowetting cell 900 is illustrated prior to the compressed and sealed state. In FIG. 9C, the electrowetting cell 900 is depicted in the post compressed and sealed state, but before the control channel electrodes 915A-B are operated to drive the liquid or gas stored in the well 910.

FIGS. 10A-E depict perspective views of an assembly of an electrowetting cell 1000 that includes a flexible PCB 1040 and a seal 130. As noted above, the flexible PCB 1040 has dimple(s) 1030 that provide electrical contact from the driving circuitry to the control channel electrodes of the electrowetting cell 1000. The flexible PCB 1040 also includes dimple(s) 1031 that provide electrical contact from the driving circuitry to the common electrode of the electrowetting cell 1000.

In FIG. 10A, the electrowetting cell 1000 is in an uncompressed state as indicated by the deformation of seal 130. Thus, the dimple(s) 1030 of the flexible PCB 140 are uncompressed. In FIG. 10B, the electrowetting cell 1000 is in a compressed state as shown by the deformation of the seal 130. Hence, the dimple(s) 1030 of the flexible PCB 140 are compressed. In FIG. 10C, the electrowetting cell 1000 is an uncompressed state and the pad(s) 1031 for electrical connection to the common electrode and the dimple(s) 1030 for electrical connection to the control channel electrode(s) are shown from a bottom view.

FIG. 10D shows a cross-section C-C is taken across the electrowetting cell 1000 where the dimple(s) 1030 and pad(s) 1031 are located and that cross-section is then shown in FIG. 10E. A more detailed cross-section D-D is taken once again in FIG. 10E where the dimple(s) 1030 and pad(s) 1031 are located to show additional details of the dimple(s) 1030 and pad(s) 1031. FIG. 10F is a zoomed in view of the area with a circled drawn around it in FIG. 10E and shows details of a dimple and a pad, and their contact to achieve electrical connection.

Figure 11:
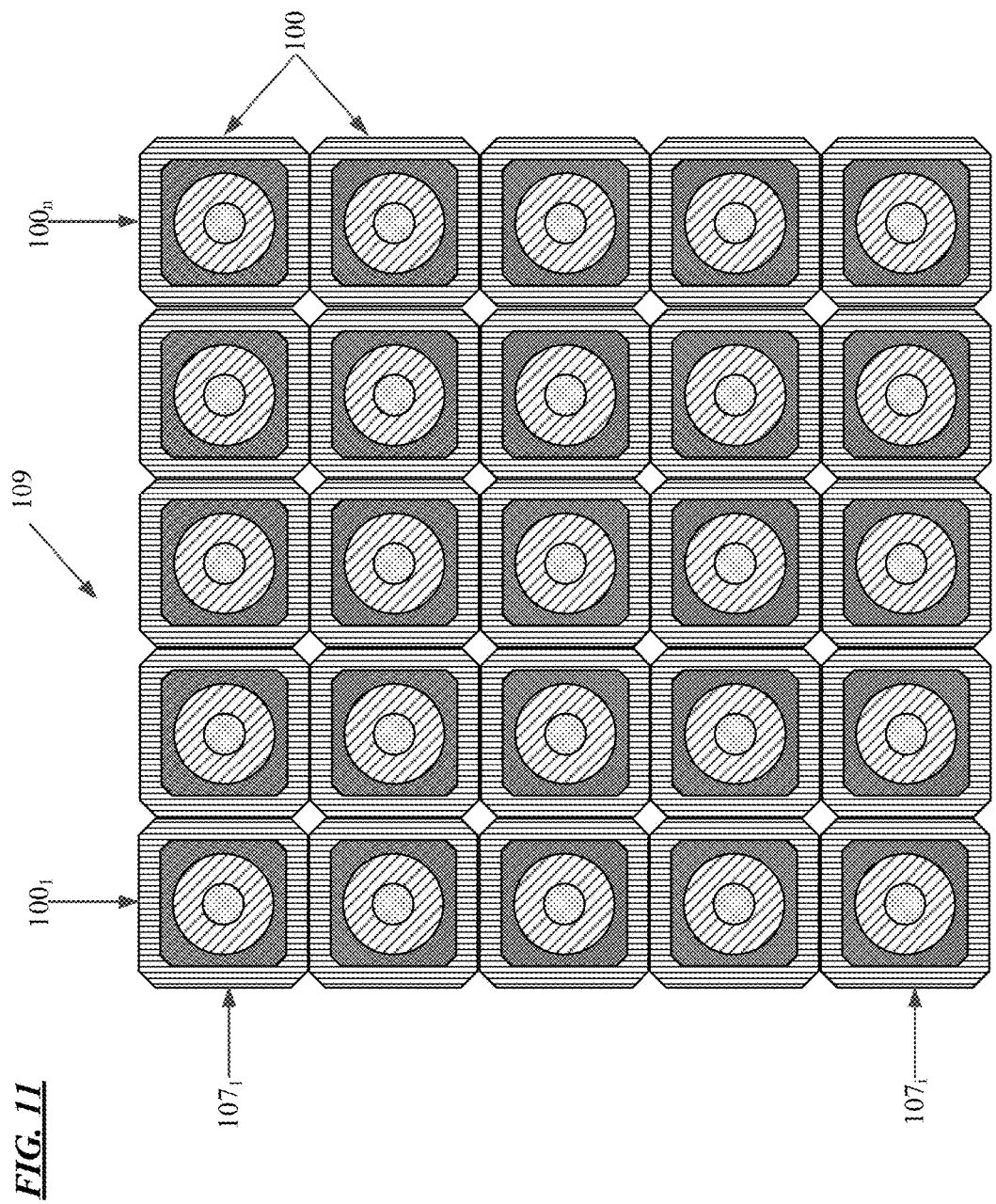
FIG. 11 depicts an assembly of electrowetting cells forming a row-and-column matrix for an array of electrowetting cells.

FIG. 11, for example, depicts assembly of a number of rows $107_1$ to $107_i$ of electrowetting cells 100 to form an array 109. Each of the i rows $107_1$ to $107_i$ includes a number n of cells $100_1$ to $100_n$. In this manner, the cells form an i×n row-and-column matrix for the array 109 of electrowetting cells 100. Although not shown, suitable leads would connect to the flexible PCB tails 141 of the various cells 100 to $100n$ of the rows $107_1$ to $107_i$ forming the array 109. For example, the leads may form a bus system connecting all of the cells of the array in common, e.g. to a single driver circuit and associated controller. In such an electrical arrangement all of the i×n electrowetting cells 100 would be controlled in common. Various other connection arrangements may be used, e.g. to control each cell independently with connections to a separate driver for each cell of the matrix, to control each row independently with connection of each row to a separate driver, or to control various sub-matrices of the array independent of each other (but with all of the cells in a given sub-matrix connected together and commonly controlled) with a separate driver connected to each sub-matrix.

In the example, the driver is separate from the cell(s) driven by the respective driver. Alternatively, the driver(s) may be more closely associated with respective cell(s). For example, some or all of the driver circuitry for a particular cell might be implemented on the flexible circuit board of the cell.

Figure 12:
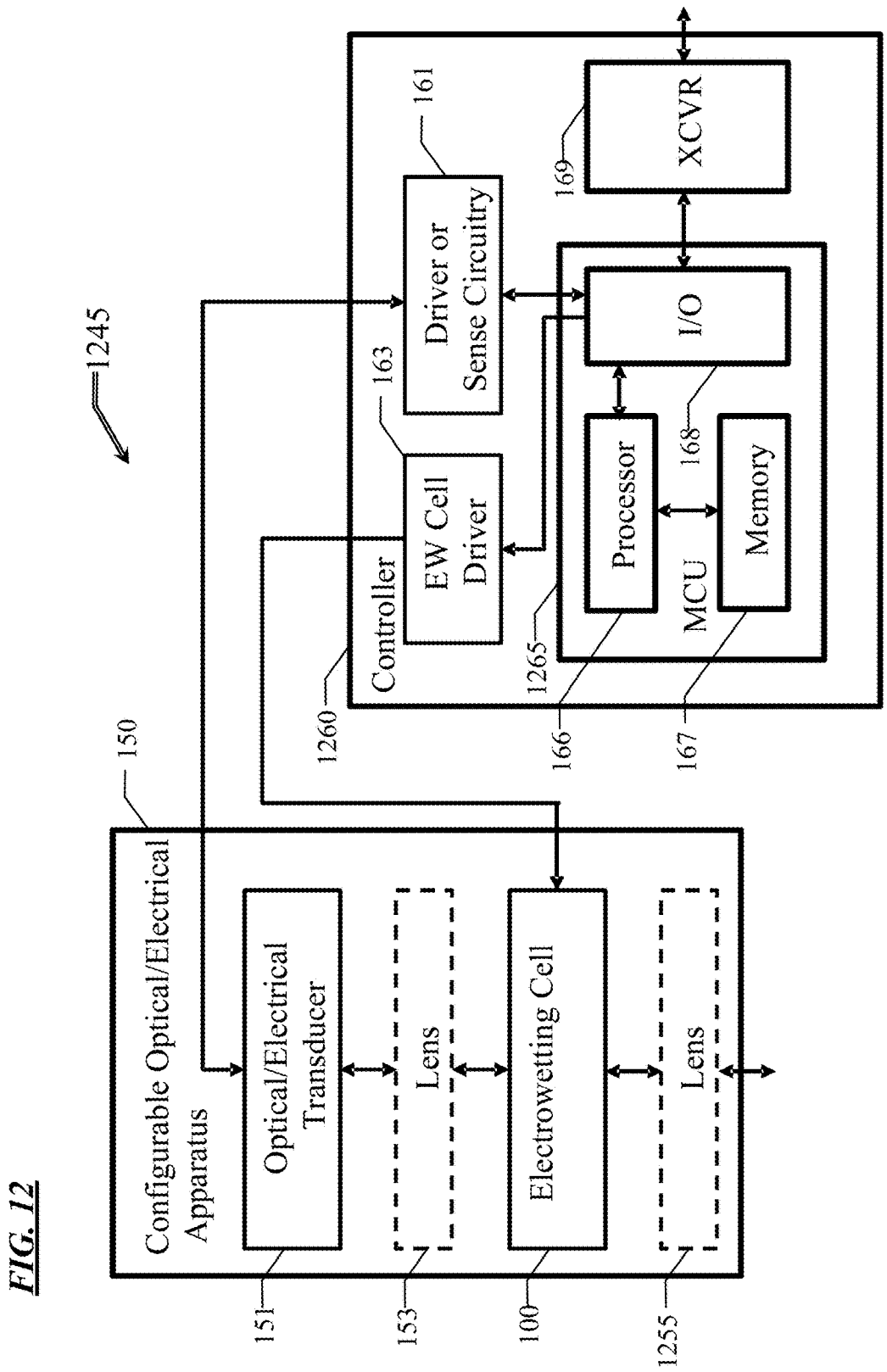
FIG. 12 is a simplified functional block diagram of a system combining an electrowetting cell like that described with an optical/electrical transducer and associated circuitry.

FIG. 12 is a simplified functional block diagram of a system 1245, which includes a configurable optical/electrical apparatus 1250 and a controller 1260. The configurable optical/electrical apparatus 1250 combines an electrowetting cell like that described above with an optical/electrical transducer 151. Although associated circuitry may be provided in the apparatus 1250, the example shows circuitry in the controller 1260, which may be somewhat separate from or even remote from the configurable optical/electrical apparatus 1250.

An optical/electrical transducer 151 is a device that converts between forms of optical and electrical energy, for example, from optical energy to an electrical signal or from electrical energy to an optical output. Examples of optical-to-electrical transducers include various sensors or detectors, photovoltaic devices and the like. Optical-to-electrical transducers discussed herein are responsive to light, and the light may be visible light, ultraviolet light, infrared, near infrared or light in other portions of the optical spectrum.

Examples of electrical-to-optical transducers include various light emitters, although the emitted light may be in the visible spectrum or in other wavelength ranges. Suitable light generation sources for use as the transducer 151 include various conventional lamps, such as incandescent, fluorescent or halide lamps; one or more light emitting diodes (LEDs) of various types, such as planar LEDs, micro LEDs, micro organic LEDs, LEDs on gallium nitride (GaN) substrates, micro nanowire or nanorod LEDs, photo pumped quantum dot (QD) LEDs, micro plasmonic LED, micro resonant-cavity (RC) LEDs, and micro photonic crystal LEDs; as well as other sources such as micro super luminescent Diodes (SLD) and micro laser diodes. Of course, these light generation technologies are given by way of non-limiting examples, and other light generation technologies may be used to implement the transducer 151. For example, it should be understood that non-micro versions of the foregoing light generation sources can be used.

When optical transducer 151 is a light source, the light source may use a single emitter to generate light or may combine light from some number of emitters that generate the light. A lamp or 'light bulb' is an example of a single source. An LED light engine may use a single output for a single source but typically combines light from multiple LED type emitters within the single light engine. Many types of light sources provide an illumination light output that generally appears uniform to an observer, although there may be some color or intensity striations, e.g. along an edge of a combined light output. For purposes of the present examples, however, the appearance of the light source output may not be strictly uniform across the output area or aperture of the source. For example, although the source may use individual emitters or groups of individual emitters to produce the light generated by the overall source; depending on the arrangement of the emitters and any associated mixer or diffuser, the light output may be relatively uniform across the aperture or may appear pixelated to an observer viewing the output aperture. The individual emitters or groups of emitters may be separately controllable, for example to control intensity or color characteristics of the source output. As such, the light source used as an emitter type of optical/electrical transducer 151 may or may not be pixelated for control purposes. The electrowetting cell 100 is controlled to selectively optically change or spatially (optically) modulate the light distribution output from the transducer and thus from the apparatus 1250. The electrowetting cell 100 may support controlled beam steering, controlled beam shaping or a combination of controlled beam steering and shaping.

In another example, optical transducer 151 is an optical-to-electrical converter, that is to say, a light sensor or detector or a photovoltaic device. The overall apparatus 1250 in such a case may be configured as an imager, other light responsive sensor, light responsive power source, or the like. The light detector may be an array of light detectors, a photo-detector such as a photodiode, or a photovoltaic device, depending on the desired function of optical/electrical apparatus 1250. Other suitable light detectors for use as optical/electrical transducer 151 include charge-coupled device (CCD) arrays, complementary metal-oxide-semiconductor (CMOS) arrays, photomultipliers, image intensifiers, phototransistors, photo resistors, thermal imagers, and micro-electromechanical systems (MEMS) imagers. Nonetheless, virtually any detector of light may be used as the transducer 151 in an optical-to-electrical arrangement of apparatus 1260. Suitable light detectors will be known to one of ordinary skill in the art from the description herein. The electrowetting cell 100 is controlled to selectively optically change or spatially (optically) modulate the field of view of light coming into the apparatus 1250 for delivery to transducer 151. The electrowetting cell 100 may support controlled beam steering, controlled beam shaping or a combination of controlled beam steering and shaping, with respect to light from a field of intended view for the particular optical-to-electrical application of the apparatus 1250.

While light source examples and light detector examples are described separately, it will be understood that both types of optical/electrical transducers 151 may be present in a single optical apparatus 1250 and/or some optical transducers can serve both input and output functions (e.g. some LEDs can be multiplexed between the emitting operation and a light detection operation). Such a combined arrangement or operation, for example, may advantageously provide capabilities to reconfigure the light output distribution in accordance with a desired light detection pattern.

In an overall apparatus 1250, with an optical/electrical transducer 151, the electrowetting cell 100 may have a lens on one side or the other side or have lenses on both sides, of the electrowetting cell 100, along the axis of the optical path through the cell 100 and to or from the transducer 151. Hence, FIG. 12 shows a dotted line (optional) example of a lens 153 between the transducer 151 and the electrowetting cell 100. Similarly, FIG. 12 shows a dotted line (optional) example of a lens 1355 on the side of the electrowetting cell 100 opposite the transducer 151. In the example, the lenses 151 or 153 would be fixed lenses.

Various examples of arrangements of a spatial optical modulator (e.g. as an electrowetting cell) with one or more cascaded lenses are disclosed in U.S. patent application Ser. No. 15/228,414, filed Aug. 4, 2016, entitled "Configurable Optical Transducers Using An Optical Modulator And One Or More Lenses," the disclosure of which is entirely incorporated by reference.

Although not shown, additional optical processing elements may be provided in the apparatus 1250. In a luminaire for general illumination or in another type of light emission device (e.g. a flash), an emitter type transducer 151 may be coupled to the electrowetting lens 100 via a collimating optic, such as a total internal reflection (TIR) lens.

A transducer 151, such as a light emitter or a light detector, often connects to corresponding electrical circuitry to operate the particular type of transducer, e.g. a driver circuit to supply power to an emitter or a sense circuit to process an output signal from a detector (and provide power to the detector if necessary). Hence, to operate the transducer 151, the controller 1260 includes corresponding driver or sense circuitry 161. The type of circuitry 161 would depend on the type of transducer 151.

The controller 1260 includes an electrowetting (EW) driver 163 to selectively provide signals to the electrodes (e.g. voltages between respective control channel electrodes and the common electrode) to control the fluid state of the electrowetting cell 100. The driver 163, for example, may be circuitry constructed/configured to apply direct current (DC) voltages or alternating current (AC) voltages or AC with a DC offset to the cell electrodes. In the example 100 of the cell above, having four control channel electrodes and a common electrode, the EW driver 163 would have four separately controllable voltage output channels each having a connection through a respective contact to a respective one of the control channel electrodes. Each separately controllable voltage output channel of the EW driver 163 would also have a connection through the common contact to the common electrode of the electrowetting cell 100. Configuration of the circuitry of the EW driver 163 would be adapted to the particular electrical control strategy (e.g. to use AC, DC or a combination of AC and DC), the intended range(s) of fluid states and thus to the beam steering and/or shaping capabilities of the electrowetting cell 100, and/or to any voltage or current limitations intended to minimize damage to the cell structure of components thereof during operation of the system 1245.

The controller 1260 also includes a processor, one or more digital storage media, data and programming in the storage and appropriate input/output circuitry. Although other processor based architectures may be used (another example is described later regarding FIG. 13), the example of controller 1260 utilizes a Micro-Control Unit (MCU) 1265, which implements the control logic for the controller 1260 and thus of the system 1245. For example, the MCU 1265 implements the logic for control of operations of the associated optical/electrical apparatus 1250. Although shown as controlling only one such apparatus 1250, the MCU and controller may control a number of such apparatuses 1250.

The MCU 1265 may be a microchip device that incorporates a processor 166 serving as the programmable central processing unit (CPU) of the MCU 1265 as well as one or more memories, represented by memory 167 in the drawing. The memory 167 is accessible to the processor 166, and the memory or memories 167 store executable programming for the CPU formed by processor 166 as well as data for processing by or resulting from processing of the processor 166. The MCU 1265 may be thought of as a small computer or computer like device formed on a single chip. Such devices are often used as the configurable control elements embedded in special purpose devices rather than in a computer or other general purpose device. A variety of available MCU chips, for example, may be used as the MCU 1265 in the controller 1260 of system 1245.

The MCU 1265 in this example also includes various input and output (I/O) interfaces, shown collectively by way of example as interface 168 in FIG. 12. The I/O interfaces 168, for example, support a control output to the EW cell driver 163 as well as a control output and/or input to the driver or sense control circuitry 161 (for the optical/electrical transducer 151). The I/O interfaces 168 also support input/output communications with one or more electronic devices, which may be connected to or incorporated in the system 1245 (e.g. to provide a user interface not shown) or which may be remote.

In the illustrated example, the controller 1260 also includes a communication transceiver (XCVR) 169 coupled to the processor 166 (and possibly to the memory 167) via an I/O output interface 168 of the MCU 1265. Although shown separately, the transceiver 169 may be implemented in circuitry on the same chip as the elements of the MCU 1265. Although the drawing shows only one transceiver 169, controller 1260 may include any number of transceivers, for example, to support additional communication protocols and/or provide communication over different communication media or channels.

The transceiver 169 supports communication with other control or processing equipment, for example, with a remote user interface device and/or with a host computer of a building control and automation system (BCAS). The transceiver 169 may also support system communication with a variety of other equipment of other parties having access to the system 1245 in an overall/networked system encompassing a number of similar systems 1245, e.g. for access to each system 1245 by equipment of a manufacturer for maintenance or access to an on-line server for downloading of programming instructions or configuration data for setting aspects of sensing or lighting operation of the associated optical/electrical apparatus(s) 1250. The circuitry of the transceiver 169 may support such communication(s) over any available medium, such as wire(s), cable, optical fiber, free-space optical link or radio frequency (RF) link.

Figure 13:
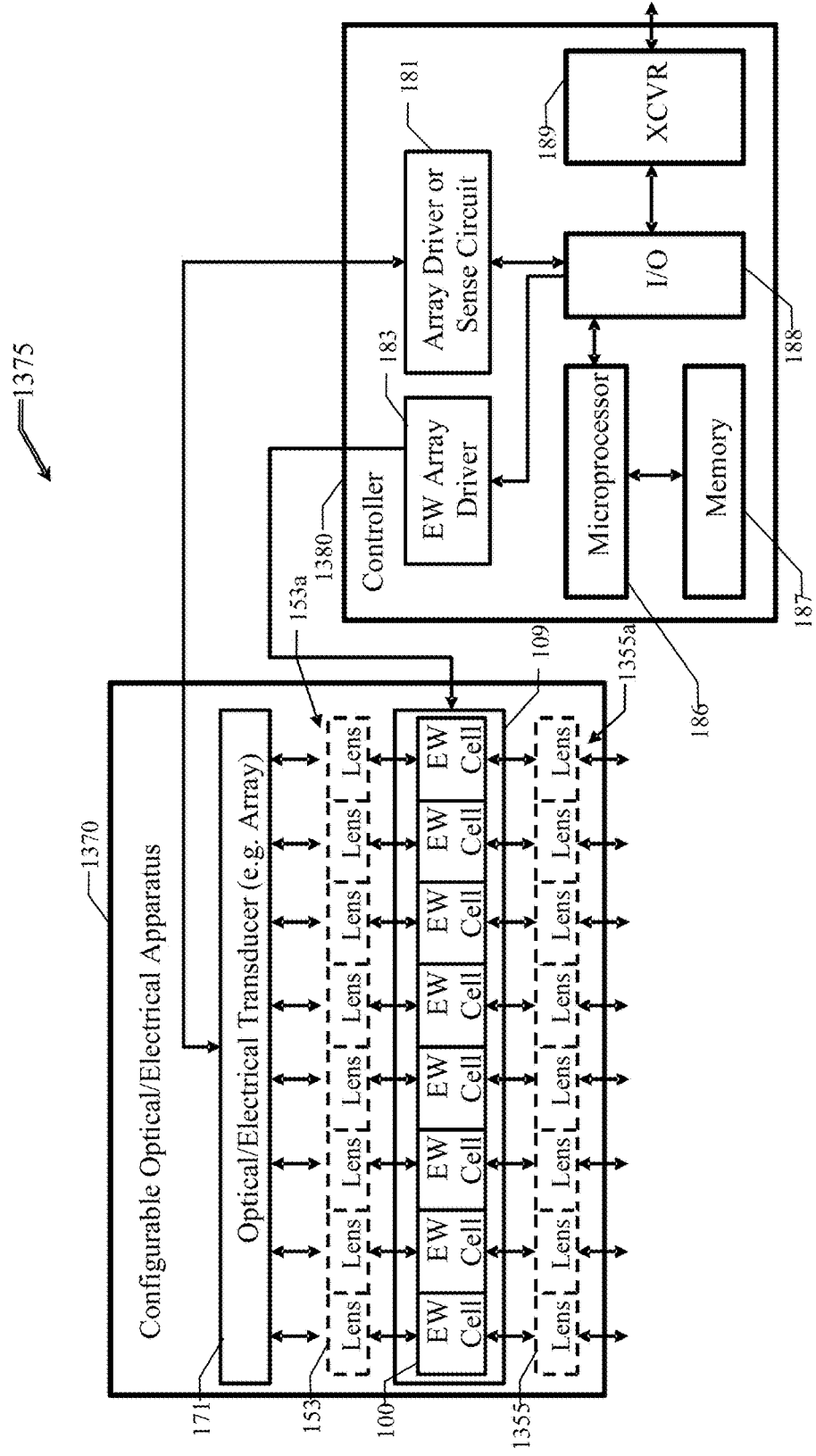
FIG. 13 is a simplified functional block diagram of a system combining an electrowetting cell array like that of FIG. 11 with one or more optical/electrical transducers and associated circuitry.

FIG. 13 is a simplified functional block diagram of a system 1375 combining an electrowetting cell array 109 like that of FIG. 11 with one or more optical/electrical transducers 171 (combined in a configurable optical/electrical apparatus 1370). The drawing also depicts an example of associated circuitry, which is implemented in a controller 1380. The electrowetting cellular array 109 is used to provide selectively controllable beam steering and/or beam shaping for any of a variety of types of optical/electrical transducers 171, including both light detectors and light emitters. The controller 1380 may be included in the apparatus 1370, or the controller 1380 may be somewhat separate from or even remote from the configurable optical/electrical apparatus 1370.

The optical/electrical transducer 171 may be any transducer device of the types discussed above, although the transducer 171 is configured to operate with an array 109 of electrowetting cells 100. Although the transducer 171 may be a single device, e.g. a single relatively large light source, in many examples, transducer 171 is an array of emitters and/or lighting input responsive devices (e.g. detectors or photovoltaic devices). In a luminaire example using the apparatus 1370, the transducer 171 might include an array of high intensity LED light emitters, where each one of the emitters is coupled to one or more of the cells 100 of the array 109. In a detector example using the apparatus 1370, the transducer 171 might include a complementary metal-oxide-semiconductor (CMOS) image sensor, a charge-coupled device (CCD) image sensor or other image detector array like any of those used in digital cameras. Each actual detector at a pixel of the image sensor array could be coupled to one or more of the cells 100 of the array 109.

In an apparatus 1370, with an optical/electrical transducer 171, the electrowetting cell array 109 may have one or more lenses on one side or the other side or have lenses on both sides, of the electrowetting cell array 109, along the axis of the optical path through the cell array 109 and to or from the transducer 171. Although there may be more or fewer lenses than there are cells 100 in the array 109, we will consider lens array arrangements, e.g. in which a lens array 153a or 1355a has a lens 153 or 1355 coupled to each cell 100 of the array 109. Hence, FIG. 13 shows a dotted line (optional) example of a lens array 153a between the transducer 171 and the electrowetting cell array 109. Similarly, FIG. 13 shows a dotted line (optional) example of a lens array 1355a on the side of the electrowetting cell array 109 opposite the transducer 171. In the example, the lenses 151 or 153 would be fixed lenses.

Although the array structure(s) are different, various examples of arrangements of a controllable electrowetting array with one or more cascaded lenses are disclosed in U.S. patent application Ser. No. 15/389,829, filed Dec. 23, 2016, entitled "Electrowetting Cellular Array And Luminaire Incorporating The Array," the disclosure of which is entirely incorporated by reference.

Although not shown, additional optical processing elements may be provided in the apparatus 1370. In a luminaire for general illumination or in another type of light emission device (e.g. a flash), each emitter type transducer in an array implementation of the transducer 171 may be coupled to one or more of the electrowetting lenses 100 of array 109 via a collimating optic, such as a total internal reflection (TIR) lens.

A transducer 171, such as a light emitter or a light detector, often connects to corresponding electrical circuitry to operate the particular type of transducer, e.g. a driver circuit array to supply power to each emitter of an emitter array or sense circuitry to process output signals from the detectors (and provide power to the detectors if/when necessary). Hence, to operate the transducer 171, the controller 1380 includes corresponding an array driver or sense circuit 181. The type of circuitry 181 would depend on the type of transducer 171, e.g. the particular array of emitters of a display or multi-pixel luminaire type source or the particular type of image sensor array.

The controller 1380 includes an electrowetting (EW) driver 183 to selectively provide signals to the electrodes (e.g. voltages between respective control channel electrodes and the common electrode) to control the fluid state of each electrowetting cell 100 of the array 109. As outlined earlier, the driver 183 may be connected to control all of the cells 100 as a single group, as some number of sub-groups (e.g. lines or sub-matrices), or as individual controllable optics.

The driver 183, for example, may include circuitry constructed/configured to apply direct current (DC) voltages or alternating current (AC) voltages or AC with a DC offset to electrodes of each cell or in common to the electrodes of some number of the cells of the array 109. If all cells are controlled in common, the circuitry of the driver 183 may be similar to that of the driver 163 discussed above, although driver 183 may have a higher power capacity to drive more cells in common. If cells are controlled individually, the driver 183 may include circuitry of a driver similar to that of the driver 163 discussed above, for each cell 100 of the array 109 or multiplexing circuitry to supply drive signals to the various cells from one or a small number of individual drivers (e.g. on a sequential basis). In a system implementation where sets of one or more lines or sub-matrix groups of cells are controlled in common, the driver 183 may include circuitry of a driver similar to that of the driver 163 discussed above, for each group of cells 100 of the array 109 that are to be commonly controlled. The separate drivers in this later implementation, however, would allow independent control of the different groups of cells within the array 109. Multiplexing may also be used to independently drive the various groups of cells 100.

The controller 1380 also includes a processor, which in this example, is implemented by a microprocessor 186. The microprocessor 186 is programmed to implement control and other processing functions of a central processing unit (CPU) of the controller 1380. The microprocessor 186, for example, may be based on any known or available microprocessor architecture, such as a Reduced Instruction Set Computing (RISC) using ARM architecture, as commonly used today in mobile devices and other portable electronic devices. Of course, other microprocessor circuitry may be used to form the CPU of the controller 1380. Although the illustrated example includes only one microprocessor 186, for convenience, a controller 1380 may use a multi-processor architecture.

The controller 1380 also includes one or more digital storage media, represented by the memory 187, for storage of data and programming. The storage media represented by the memory 187 may include volatile and/or non-volatile semiconductor memory, any suitable type of magnetic or optical storage media, etc. The microprocessor 186 implements the control logic for the controller 1380 and thus of the system 1375, based on executable instructions of the programming, which in the example is stored in the memory 187. The executable instructions may be firmware or software instructions, to configure the microprocessor 186 to perform electrowetting control operations, lighting control operations or light detection operations, etc. Based on execution of the program instructions, the microprocessor 186, for example, implements the logic for control of operations of the transducer 171 and the cellular electrowetting array 109, in the associated optical/electrical apparatus 1370. Although shown as controlling only one such apparatus 1370, the microprocessor 186 and thus the controller 1380 may control a number of such apparatuses 1370.

Although shown in simplified block form, the architecture of controller 1380 may be similar to that of any of a variety of types of types of other smart electronic devices, such as an architecture for a personal computer or an architecture for a mobile terminal device.

The processor 166 of the MCU 1265 (FIG. 12) and the microprocessor 186 (FIG. 13) are examples of processors that may be used to control an electrowetting cell or array of such cell and control or respond to outputs of any associated optical/electrical transducer(s). As used herein, a processor is a hardware circuit having elements structured and arranged to perform one or more processing functions, typically various data processing functions. Although discrete logic components could be used, the examples utilize components forming a programmable central processing unit (CPU). A processor for example includes or is part of one or more integrated circuit (IC) chips incorporating the electronic elements to perform the functions of the CPU.

The processor 166 or the microprocessor 186 executes programming or instructions to configure the system 1245 or 1375 to perform various operations. For example, such operations may include various general operations (e.g., a clock function, recording and logging operational status and/or failure information) as well as various system-specific operations (e.g. controlling beam steering and beam shaping of input or output light, operation of the transducer(s) and the like) of an optical/electrical apparatus 1260 or 1380 incorporating one or more of the electrowetting cells and associated transducer(s). Although a processor may be configured by use of hardwired logic, typical processors in lighting devices are general processing circuits configured by execution of programming, e.g. instructions and any associated setting data from the memories shown or from other included storage media and/or received from remote storage media.

As outlined above, a class of applications of the cell 100 with suitable light source type transducers provide configurable luminaires. The term "luminaire," as used herein, is intended to encompass essentially any type of device that processes energy to generate or supply artificial light, for example, for general illumination of a space intended for use of occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaires in or on a particular premises have other lighting purposes, such as signage for an entrance or to indicate an exit. In most examples, the luminaire(s) illuminate a space or area of a premises to a level useful for a human in or passing through the space, e.g. general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below.

Terms such as "artificial lighting," as used herein, are intended to encompass essentially any type of lighting that a device produces light by processing of electrical power to generate the light. An artificial lighting device, for example, may take the form of a lamp, light fixture, or other luminaire that incorporates a light source, where the light source by itself contains no intelligence or communication capability, such as one or more LEDs or the like, or a lamp (e.g. "regular light bulbs") of any suitable type. The illumination light output of an artificial illumination type luminaire, for example, may have an intensity and/or other characteristic(s) that satisfy an industry acceptable performance standard for a general lighting application.

Artificial light output from a luminaire may carry information, such as a code (e.g. to identify the luminaire or its location) or downstream transmission of communication signaling and/or user data. The light based data transmission may involve modulation or otherwise adjusting parameters (e.g. intensity, color characteristic or optical spatial distribution) of the illumination light output from the device.

Another class of applications for the electrowetting cell relate to sensing applications. A sensing application typically combines a detector type transducer with one or more electrowetting. The detector, for example, may be a single light responsive component, a combination of several light responsive components detecting the same or different light characteristics, or a pixel array of light detectors (e.g. for image sensing). Although some photovoltaic devices may output power in response to optical energy, sensors typically involve some processing circuitry to operate the particular type of detector.

Displays and a variety of other applications of the electrowetting cell also are within the scope of the disclosure above.

The examples shown and described above relate to a light transmissive electrowetting cell, that is to say a cell that acts as a lens and/or prism and is relatively transparent with respect to light that passes entirely through the optically active area of the cell. Teachings herein may also relate to reflective electrowetting cells. For a reflective cell, a reflector could either be at one end of the well (e.g., distal end that is enclosed by the light transmissive member or the proximal end that is enclosed by the cover glass covering the opening of the well) or at the meniscus forming the interface of the two fluids.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An electrowetting cell comprising:
a substrate that supports a well filled with a liquid;
a control channel electrode to control the liquid via an electric field;
a circuit connection to supply a drive signal to the control channel electrode;
a transparent cover;
a spacer between the substrate and the transparent cover;
a seal coupled to the spacer to seal the well between the substrate and the transparent cover, wherein an expansion space, exterior to the well, is formed with the coupling of the seal and the spacer;
a common electrode; and
a flexible printed circuit board connected to the circuit connection, the flexible printed circuit board comprising one or more dimples that are compressible raised or depressed areas formed on the flexible printed circuit board to provide electrical contact for the control channel electrode on one side of the flexible printed circuit board or for the common electrode on another side of the flexible printed circuit board.

2. The electrowetting cell of claim 1, wherein as temperatures within the electrowetting cell change and the liquid thermally expands or contracts, the seal compensates laterally by deforming sideways in an open space of the expansion space.

3. The electrowetting cell of claim 1, wherein the spacer includes a vent to allow a free exchange of a compensating medium in and out of the expansion space from an outside region located outside or from ambient outside of the electrowetting cell.

4. The electrowetting cell of claim 3, wherein the compensating medium is a gas.

5. The electrowetting cell of claim 1, wherein:
the seal is an O-ring with a C-shape cross-section; and
the spacer supports top and bottom portions of the seal when the seal is mounted on the spacer.

6. The electrowetting cell of claim 1, wherein:
the control channel electrode is formed on the substrate and one or more of the dimples on the one side of the flexible printed circuit board provide compressible contact allowing for small gaps between the substrate and the flexible printed circuit board while still maintaining electrical connection;
the common electrode is connected to the spacer; and
one or more of the dimples on the other side of the flexible printed circuit board provide compressible contact to the spacer allowing for small gaps between the spacer and the flexible printed circuit board while still maintaining electrical connection through the spacer.

7. An apparatus comprising the electrowetting cell of claim 1 and an optical/electrical transducer optically coupled to the electrowetting cell to send or receive light through first and second fluids in the well.

8. A system comprising the apparatus of claim 7 and a processor coupled to the electrowetting cell and the optical/electrical transducer.

9. A plurality of the electrowetting cells of claim 1 mounted together to form a cell array.

10. An apparatus comprising the plurality of electrowetting cells of claim 9 and at least one optical/electrical transducer optically coupled to the electrowetting cells of the array to send or receive light through the first and second fluids in the well.

11. A system comprising the apparatus of claim 10 and a processor coupled to the electrowetting cells of the array and to the at least one optical/electrical transducer.

* * * * *